United States Patent [19]

Martin et al.

[11] 3,852,409

[45] Dec. 3, 1974

[54] PROCESS FOR THE REMOVAL OF PARTICULATE MATTER AND ACIDIC GASES FROM CARRIER GASES

[75] Inventors: Willis Leon Martin, Longview; Orvis L. Holland, Linden; Thomas K. Ewan, Daingerfield; James E. Hurse, Mt. Pleasant, all of Tex.

[73] Assignee: Lone Star Steel Company, Dallas, Tex.

[22] Filed: Oct. 31, 1972

[21] Appl. No.: 302,608

[52] U.S. Cl.............. 423/242, 423/215.5, 23/271, 55/59, 55/72
[51] Int. Cl............................................. C01b 17/00
[58] Field of Search ........................ 423/242–244, 423/215.5; 23/271; 55/59, 72, 73

[56] References Cited
UNITED STATES PATENTS

| | | | |
|---|---|---|---|
| 2,684,231 | 7/1954 | Pomykala | 423/242 |
| 3,613,333 | 10/1971 | Gardenier | 55/89 |

OTHER PUBLICATIONS

Perry Chemical Engineer's Handbook, 4th Ed., 6-29 – 6-32.
The Condensed Chemical Dictionary, 6th Ed. p. 933.

*Primary Examiner*—Oscar R. Vertiz
*Assistant Examiner*—Gregory A. Heller
*Attorney, Agent, or Firm*—Donald E. Degling; James D. Bock

[57] ABSTRACT

A process is disclosed for the removal of particulate matter and acidic gases such as sulfur dioxide from a carrier gas in which the carrier gas is driven through an elongate mixing tube by a steam ejector and mechanically atomized water is introduced into the outer region of the jet of steam emerging from the nozzle of the steam ejector. The mechanically atomized water is further atomized by the shearing action of the steam jet to form high velocity droplets which are intimately and turbulently mixed with the carrier gas so that the particulate matter in the carrier gas becomes entrained with the water droplets. The flow of the turbulent mixture of steam, carrier gas and water droplets through the mixing tube is regulated to provide a retention time in the mixing tube so that the water droplets containing the particulate matter grow to a size sufficient to permit separation of the drops by centrifugal means. If it is desired to remove sulfur dioxide or other acidic gases from the carrier gas in addition to the particulate matter, an alakaline reagent is introduced into the water prior to the mechanical atomization of the water whereby the further atomized high-velocity water droplets will contain the alkaline reagent. The flow of the turbulent mixture in the mixing tube is regulated to provide sufficient time for the alkaline reagent to react with the acidic gases and form aqueous droplets of sulfur reaction products, for the aqueous droplets to entrain the particulate matter from the carrier gas, and for the aqueous droplets to grow to a size sufficient to permit separation of the droplets by centrifugal means.

28 Claims, 14 Drawing Figures

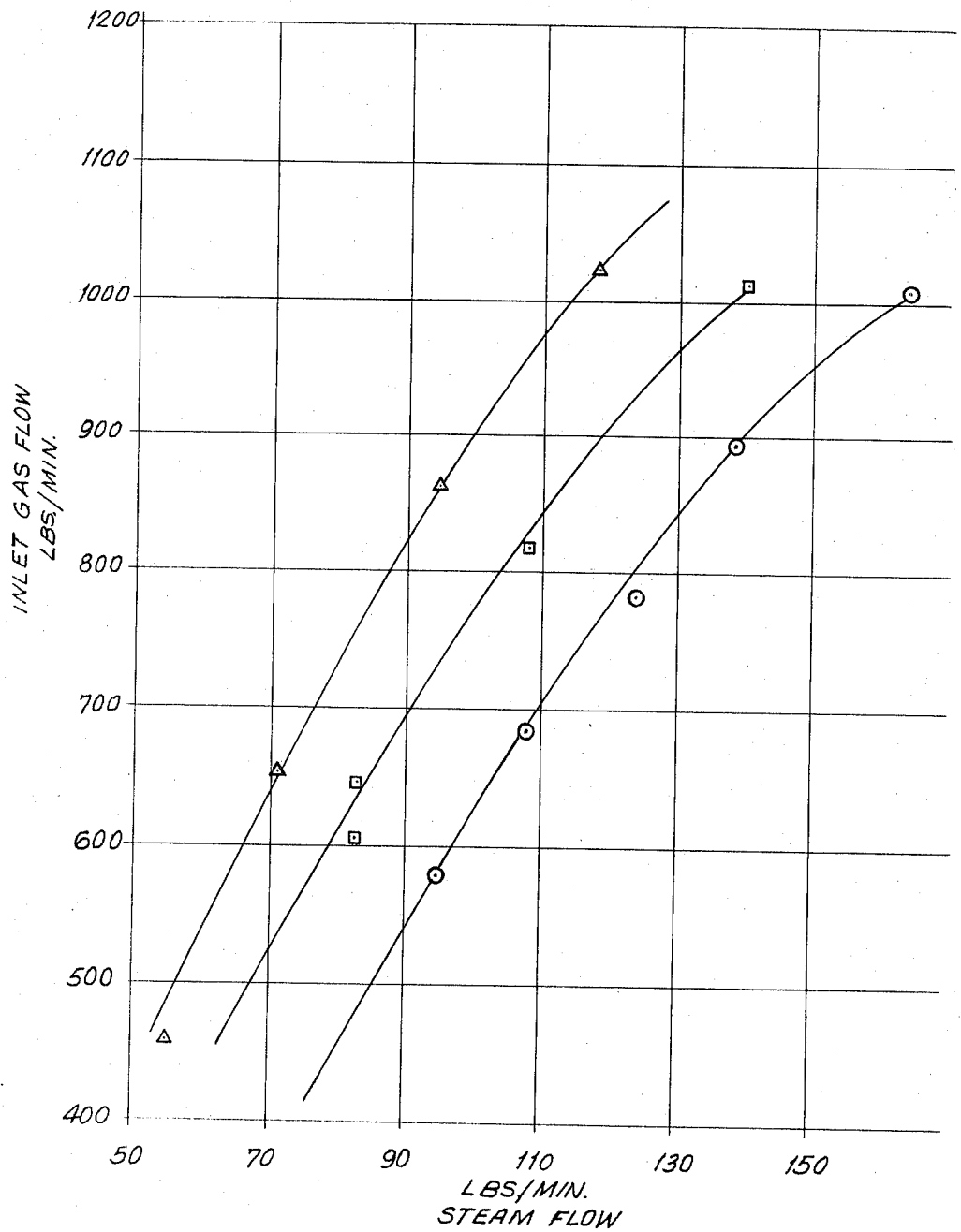

PORTION OF MOLLIER DIAGRAM
(LIQUID WATER REGION)

| PRESS. PSIA | TEMP. °F | H1 BTU/LB. | H2 BTU/LB. | ΔH BTU/LB. | ΔH$_a$ BTU/LB. |
|---|---|---|---|---|---|
| 550 | 477 | 461 | 413 | 48 | 43 |
| 450 | 456 | 437 | 396 | 41 | 36 |

PORTION OF MOLLIER DIAGRAM
(WATER VAPOR REGION)

| NOZZLE NO. | PRESSURE PSIA | TEMP °F | H1 BTU/LB. | H2 BTU/LB. | ΔH BTU/LB. | ΔHa BTU/LB. |
|---|---|---|---|---|---|---|
| 1 | 550 | 477 | 1204 | 947 | 257 | 239 |
| 2 | 320 | 423 | 1203 | 981 | 222 | 206 |
| 3 | 190 | 377 | 1198 | 1012 | 186 | 173 |

PROCESS FOR THE REMOVAL OF PARTICULATE MATTER AND ACIDIC GASES FROM CARRIER GASES

BACKGROUND OF INVENTION

1. Field of the Invention

This invention relates to the field of air pollution control and more particularly to the removal of particulate matter and acidic or other soluble gases from gas streams formed by industrial and chemical processes.

Within the past few years, various governmental agencies as well as representatives from the industrial and private sectors of the economy have become increasingly interested in the improvement of the ecology and particularly in the control of air and water pollution. One of the principal areas of concern has been the exhaust gases emitted by various industrial and chemical processes. Such exhaust gases may contain particulate matter varying widely in size and chemical composition as well as gaseous and liquid material. The gaseous and liquid constituents of the exhaust gases may vary from substances such as steam, carbon dioxide and water, which are generally considered to be innocuous, to oxides of sulfur and nitrogen, carbon monoxide and various acids which are highly toxic and must be carefully controlled to prevent severe damage to the ecology. The particulate matter in the exhaust gases may vary in size from large particles such as cinders to particles of submicronic size. Typical of the submicronic particles are the iron oxide particles generated during the refining of steel in the open hearth and basic oxygen furnace processes of steelmaking.

Although the concern of all segments of the economy with methods of pollution control has been emphasized in recent years, the art already had produced a number of well-established methods for the removal of particulate matter from gas streams. Similarly, several methods for the removal of gaseous materials have been developed.

2. Description of the Prior Art

With respect to the collection of particulates from gas streams, the art has developed several general types of equipment. The first of these includes mechanical separators such as filters which provide a screen or other barrier to the passage of particulate matter while permitting the gas to flow through the barrier. Another form of the mechanical separator is the centrifugal or cyclone separator in which the particulate matter is separated from the gas by changing the direction of the gas stream.

Separation of particulate matter may also be accomplished by the use of electrostatic forces as in the well-known electrostatic precipitator. In this device, the contaminated gas is passed through an electric field which causes the particulate to become charged electrically and attracted to oppositely charged plates of the precipitator where it may be removed by mechanical means.

It will be recognized that, in addition to the centrifugal and electrostatic forces employed in the equipment referred to above, gravitational forces are also present and may produce some separation of particulate. Separation equipment has also been designed which relies principally on gravitational forces. Such equipment usually comprises a large settling chamber in which the velocity of the gas approaches zero. If the chamber is large enough, the residence time of the gas will be sufficient to permit a large portion of the particulate matter to settle out.

In general, the separators described above are effective to remove relatively large particulate, but the collection efficiency decreases rapidly when the particulate is less than about 1 to 2 microns in size (1 micron = 1 millionth of a meter).

Up to this point, the separation equipment referred to has been of the dry type but many forms of wet scrubbers have also been developed. The simplest wet scrubber comprises a chamber containing one or more spray nozzles. The chamber may be a duct or combustion chamber or a specially designed spray chamber. In general, the gas velocity through the chamber is relatively low and the particulate is removed by collision between the water droplets and the particulate. If steam is also present, the particulate matter may be conditioned or agglomerated through the process of thermophoresis and, of course, separation as a result of gravitational or centrifugal forces may also occur. The spray chamber usually involves low energies and is most effective for the larger particulate.

In an effort to improve collection efficiencies, various types of high-energy venturi scrubbers have been employed. One form of the venturi scrubber comprises a duct having a converging section, a throat section and a diverging section through which the contaminated gas is forced by means of fans, blowers or steam ejectors. At the throat section where the gas velocity is maximum, water is injected through one or more nozzles or sprays to impact against the gas stream to form droplets which collide with the particulate matter contained in the gas stream. Particulate removal is due principally to collision between the particulate and the water droplets. In the venturi scrubber here referred to, the relative velocity between the gas and water is created by driving the gas with fans, blowers or ejectors as noted above. It is, of course, irrelevant whether the gas is moved relative to the water or vice versa and both systems have been employed in connection with the venturi scrubber.

In the venturi jet scrubber, the motive force is provided by a cold water ejector mounted generally on the axis of the converging section of the venturi and no other driving force is required. Water is pumped through the ejector nozzle where it is broken up or atomized into droplets which are then mixed with the gas. Driving is accomplished by an exchange of momentum between the driving water and the driven gas and, simultaneously, the particulate in the gas is removed by collision or impaction with the water drops. A venturi jet scrubber of the type described here has long been available from the Koertrol Corporation and is designated as the "Type 7010" scrubber.

The venturi scrubbers described above are effective to remove particulate matter which is larger than about 2 microns, but the removal efficiencies generally fall off rapidly as the particulate size drops below 1 micron. In order to meet the requirements of many of the new air pollution codes, it is necessary to remove particulate in the submicron range. While the submicron sized particles may comprise a small percentage of the total weight of the particulate matter contained in the contaminated gas, they may easily account for up to 98% of the number of particles involved.

It is well-known that the efficiency of the process of particulate collection by impaction or collision is dependent both upon the size of the water droplet and the relative velocity between the droplet and the particle. Thus, as the relative velocity between the droplet and the particle increases, the probability of collision and subsequent collection also increases. It is also apparent that, for a given mass of water, the probability of collision is increased if the mass of water is divided into a large number of small drops instead of a smaller number of larger drops. Finally, it is known that streamlines of flow form around moving bodies, such as water droplets, and that, if a particle is sufficiently small relative to a water droplet, it will be displaced from its path of movement and flow around the droplet without colliding therewith. It has thus been clear to those skilled in the art that to improve the collection efficiency with respect to small particulate it would be necessary to (a) increase the mass flow of water, (b) decrease the droplet size, or (c) increase the relative velocity between the droplet and the particle. Each of these alternatives represents an increase in the energy requirements: An increase in the mass flow of water may be accomplished by an increase in the pumping power. The droplet size may be decreased somewhat by increasing the water pressure or through changes in the nozzle design to provide greater atomization of the water. Finally, the relative velocity between the droplet and the particle may be increased by increasing the energy applied to drive the driving fluid.

Each of the above alternatives has been applied to high-energy wet scrubbers. In the case of the venturi jet scrubber referred to above, it is apparent that in order to improve the collection efficiency the energy supplied to the water jet must be increased. As water itself is substantially incompressible, additional energy may be introduced more effectively by raising the temperature of the water than by raising the pressure of the water. Of course, it is necessary to increase the pressure of the water as well in order to prevent boiling in the water supply system ahead of the nozzle.

Where hot water is used as the source of driving energy, the device is known as a hot-water ejector. The hot-water ejector has long been known as an effective drive for wind tunnels (see U.S. Pat. Nos. 2,914,941 and 3,049,005). The hot-water drive has also been applied to a drive for jet engine test facilities where it provides a low-pressure environment to simulate various altitude conditions and simultaneously muffles and cleans the combustion products of the rocket or jet engine being tested. (See O. Frenzl "Hot-Water Ejector for Engine Test Facilities," Journal of Spacecraft, May–June 1964, Vol. 1, No. 3, pp. 333–338). As noted by Dr. Frenzl in the above reference, the hot-water drive was developed as an improvement over the steam-ejector drive that had previously been utilized to drive wind tunnels and engine test facilities. In order to drive wind tunnels, particularly those operating at supersonic speeds, it was necessary to provide enormous amounts of energy over relatively short periods of time. Even though steam at a predetermined pressure and temperature contains greater heat energy or enthalpy than the same mass of water, it may not be economically feasible to store large quantities of steam in an accumulator, and it is not possible to withdraw all of the steam from a steam accumulator. However, a hot-water accumulator can be emptied rapidly and substantially all of the stored energy made available for use.

The types of particulate control equipment which have been described above have also been used in various combinations. Thus, it has been common to use a spray chamber followed by a cyclone separator, a venturi jet scrubber followed by a separator or two venturi jet scrubbers followed by a separator.

A scrubber system of the latter type is described in an article by L. S. Harris, entitled "Fume Scrubbing With the Ejector Venturi System" (Chemical Engineering Progress, Vol. 62, No. 4, pp. 55–59, April 1966). Harris provides a scrubber for submicron particulate in which the first stage comprises a venturi jet scrubber where water under pressure acts both as the driving means and the cleaning medium while steam or air is introduced into the water jet at the nozzle to atomize and heat the water. The ejected spray of steam and water droplets entrains and mixes with the exhaust gases and cleans principally through processes of impaction or collision though other processes, including condensation, may also occur. The output of the first scrubber is directed to a conventional venturi jet scrubber and the water injected in both scrubbers together with the entrapped particulate is separated in a separating chamber or centrifugal separator.

A scrubber system designed to remove submicronic boron oxide particles from the exhaust gases produced by jet engines comprising a spray chamber and a centrifugal separator is described in a report by David, Rhodes and Smith, entitled "Methods of Removing Boron Oxide Particles from Exhaust Gases," dated October 1957 (ASTIA Document No. AD-135346; Library of Congress Document No. PB 135391). In the David apparatus, the system was driven by the exhaust gases exiting at subsonic speeds from the engine and cleaning was effected by a combination of water injection and steam and water sprays. Cleaning was effected not only by impaction in the spray chamber but also by condensation of the steam generated in the injection region on the particulate matter contained in the gas stream. The water droplets containing particulate matter were separated from the gas stream by a centrifugal separator.

The use of the hot-water drive referred to above in conjunction with a water separator is also shown in Gardenier U.S. Pat. No. 3,613,333 where the hot water in its liquid state is both the source of the driving energy and the cleaning medium.

In applicants' copending application Ser. No. 291,007, filed Sept. 21, 1972, an apparatus and method for removing particulates and gaseous $SO_2$ is disclosed which incorporates a spray chamber for conditioning the contaminated gas and removing the large particulate, a hot-water drive and chemical injection unit for driving the gas and capturing the remaining particulate and the $SO_2$ reaction products in water droplets, and a cyclone separator for separating the water droplets and $SO_2$ reaction products from the cleaned gas.

SUMMARY OF THE INVENTION

The present invention relates to an improved method and apparatus for driving gas streams and removing particulate and gaseous material therefrom.

In accordance with applicants' method, the driving and cleaning functions of the apparatus are separately and independently controlled and performed by separate means. More particularly, the driving function is provided by a steam-jet ejector, whereas the cleaning may be performed by untreated and unheated water injected into the jet of steam exiting from the steam ejector nozzle and flowing into a properly proportioned cylindrical mixing tube adjacent to, but downstream from, the exit end of the steam ejector nozzle. The preferably untreated and unheated water is mechanically atomized into a large number of small droplets by means of atomizing spray nozzles and then injected into the jet of steam at a point where it may be further atomized by the jet of high-velocity steam exiting from the steam ejector. As an optional addition to the steam-jet ejector and the water injector, applicants may condition the contaminated gas in a spray atomizing chamber positioned in advance of the steam ejector. In any event, the water and contaminants leaving the mixing tube are separated from the gas in a centrifugal separator which communicates with the discharge end of the mixing tube.

The process of the present invention is essentially an energy-controlled process in which a portion of the available thermal energy of the steam is first converted to kinetic energy to drive the contaminated carrier gases. However, before the thermal and kinetic energies of the steam and the driven gas reach an equilibrium condition, a portion of the energy of the steam is used to atomize water into fine droplets and to accelerate the water droplets to high velocities in the mixing tube. The high-velocity small droplets are then available to collect particulate by the processes of impaction or collision. In addition, the cold water provides a cooling effect supplemental to the cooling resulting from the expansion of the steam within the mixing tube. As a result of the cooling effect, a substantial portion of the steam and other condensible vapors will condense within the mixing tube. As condensation preferentially occurs at nucleation sites, such as particulate matter or water droplets already in existence, the condensation process acts both to capture additional particulate matter in droplets and to enlarge existing droplets. The mixing tube is designed to be of sufficient length in view of the velocity of the gases flowing therethrough to provide droplets of a size which may be separated efficiently by centrifugal means. The diameter of the cylindrical mixing tube is proportioned to the steam nozzle to function as an effective ejector pump.

It is, of course, necessary to treat the water used to form the driving steam to remove chemical constituents which would otherwise foul the steam boiler just as it is necessary, though perhaps to a lesser degree, to treat the water which is used to drive a hot-water ejector. However, as the enthalpy of the steam which may be used is far greater than the enthalpy of the water used in a hot-water ejector which produces the same gas driving power, the treated water requirement for the steam ejector is considerably lower. This may be shown by reference to the portions of the Mollier diagram for saturated water and saturated steam discussed hereafter. The decrease in water makes possible a large saving in treating costs for water since the additional water which is injected into the jet of steam to provide the principal cleaning effect may be unheated and untreated industrial grade water. Thus, though the total amount of water used in the present process may approach that used in the hot-water ejector process referred to above, the cost of the water may be reduced as much as 75%. Where the quantity of gas to be handled is large, or the desired draft is high, while the dust loading of the gas is relatively low, the total water requirements will be considerably lower than those of the hot-water ejector process with consequent savings in the cost of slurry treatment.

In addition to the cost and performance advantages related to the use of untreated water, a further advantage appears when it is desired to remove acidic gases such as sulfur dioxide from a contaminated gas stream. As disclosed in applicants' copending application Ser. No. 291,007 referred to above, alkaline material such as calcium oxide, calcium hydroxide, sodium carbonate, sodium hydroxide, or an oxidizing agent such as potassium permanganate, when introduced as a water solution or slurry into the highly turbulent zones of the steam jet adjacent and downstream of the ejector nozzle, will efficiently remove sulfur dioxide and other acidic gases as well as organic odors from a gas stream. Although formed in a different manner than that set forth in applicants' copending application, the turbulent mixing zones created according to the present invention are also effective as acidic gas scrubbers as shown hereafter.

A further advantage of the present process employing a steam ejector in contrast to the hot-water ejector lies in the controllability of the process. The steam ejector is capable of operating over a wide pressure range by throttling the steam supply. It will be appreciated that the driving power of the ejector is a function of the available enthalpy of the steam delivered in the ejector nozzle and this, in turn, is a function of the pressure, temperature and entropy of the entering steam. Thus, by a simple throttling control, the driving power of the ejector and the resulting draft produced by the ejector can be adjusted to any value within the operating range of the ejector. It is therefore possible to provide, within broad limits, any draft which may be desired and to vary the draft to meet the varying requirements of the chemical or industrial process which generates the contaminated exhaust gases involved.

The cleaning power of the system is chiefly a function of the mass flow of injection water and the size of the droplets into which the cleaning water is mechanically atomized by spray nozzles and further atomized by the steam jet. As is shown hereafter, the water is injected into a portion of the steam jet in such a manner that within the operating range of a properly designed steam ejector and mixing tube combination, the water is atomized into drops which are sufficiently small to capture even the submicron sized particulate generated, for example, during the oxygen-lancing portion of an open hearth steel refining operation. The mass rate of flow of the water can then be varied with the dust loading of the gas to produce the most efficient operation consistent with the degree of cleaning desired. As shown hereafter, virtually any desired cleaning efficiency can be obtained through control of the rate of water injection.

The present invention, as well as further objects and advantages thereof will be apparent from the following description and accompanying drawings in which:

FIG. 9 is a graphical representation of the typical pumping performance of three different steam nozzles used in the apparatus of the present invention.

DESCRIPTION OF THE PREFERRED EMBODIMENT

Figure 1:
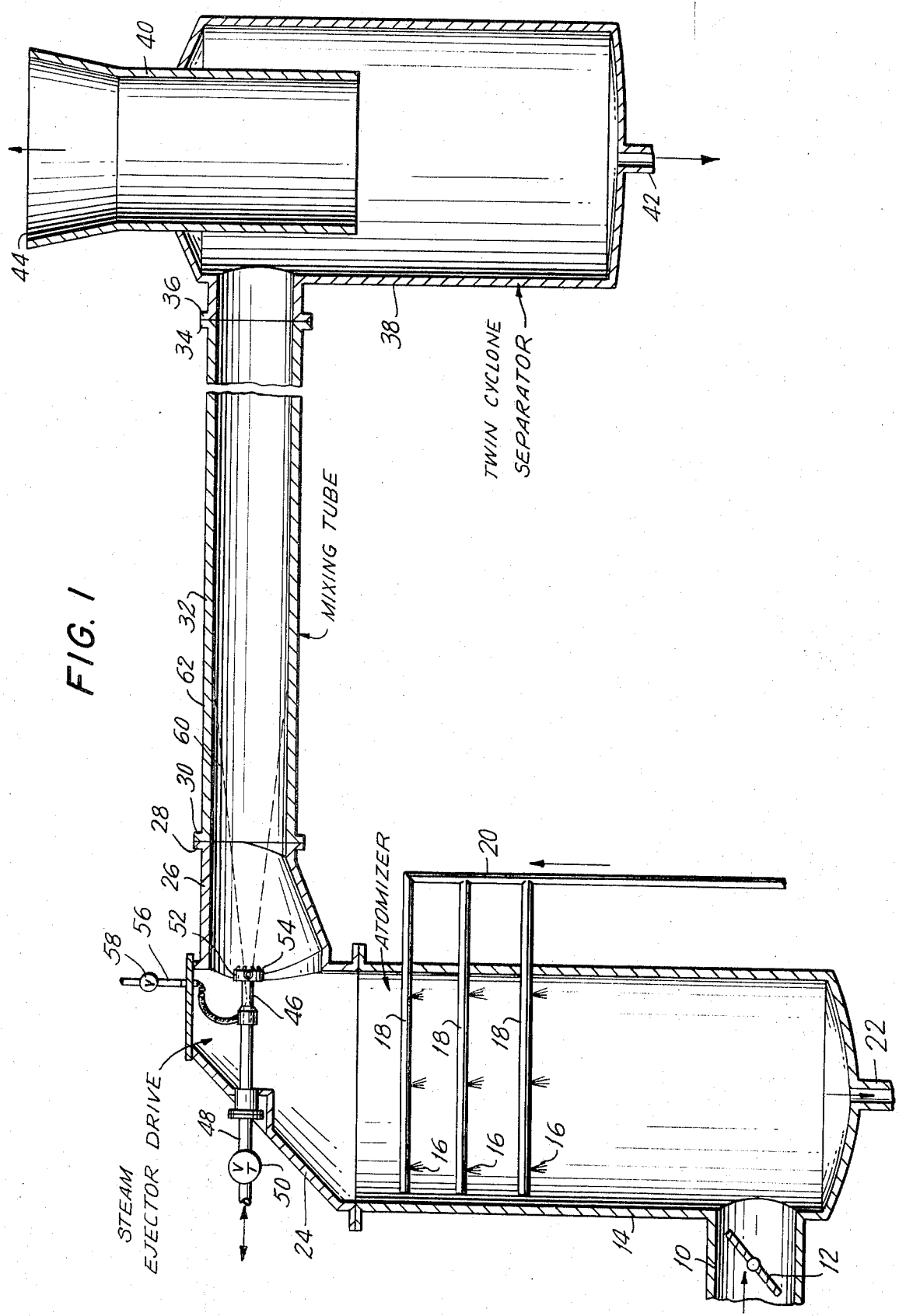
FIG. 1 is a schematic elevational drawing in cross-section showing the atomizer, steam-ejector drive and water injector, mixing tube and twin cyclone separator which may be utilized in the practice of the present invention.

Referring now to FIG. 1, 10 indicates a duct through which exhaust gases enter the apparatus. A damper 12 may be provided in the duct 10 to control the flow of gases therethrough. The duct 10 communicates with the lower end of an atomizer chamber 14 of relatively large diameter compared with the duct 10. Raw water is introduced into the atomizer chamber 14 through a series of spray nozzles 16 mounted on pipes 18 which are manifolded at 20 to a raw water source (not shown). A drain 22 is provided at the bottom of the atomizer through which a slurry of particulate matter and water may be removed for treatment in a water treatment system of conventional design.

The top of the atomizer chamber 14 is closed by an angular head 24 having a transition area 26 and a circular flanged exit orifice 28. The orifice 28 of the atomizer head 24 communicates with a flanged orifice 30 formed on one end of a cylindrical mixing tube 32. The opposite end of the mixing tube 32 is similarly fitted with a flanged orifice 34 which mates with an orifice 36 connected tangentially to the upper region of a pair of twin cyclones 38. The twin cyclones 38 are generally cylindrical in form and include stacks 40 of smaller diameter which extend into the central region of the cyclone. A drain 42 is formed at the bottom of each cyclone through which a slurry of water and particulate may be removed for treatment in a water treatment facility (not shown). Cleaned gas exits from the open upper end 44 of the cyclone stack 40.

A steam ejector nozzle 46 is mounted in the atomizer head 24 coaxial with the cylindrical mixing tube 32. Steam under pressure is supplied to the ejector nozzle 46 through a steam line 48 fitted with an adjustable throttling valve 50. Raw water under pressure is fed to a water injector 52 fitted with a plurality of injector nozzles 54 through a water line 56 provided with a flow control valve 58.

The steam required for the process may be supplied by passing the exhaust gases to be cleaned through a waste-heat boiler to utilize the heat content of the gas or by utilizing other available sources of steam. Steam at pressures greater than about 50 psia. may be used in the process. The water required for the water injector 52 is preferably unheated and untreated water, although treated water may, of course, be used. While the temperature of the water is not critical to the process, improved performance has been noted with colder water since increased steam condensation will be induced.

Figure 2:
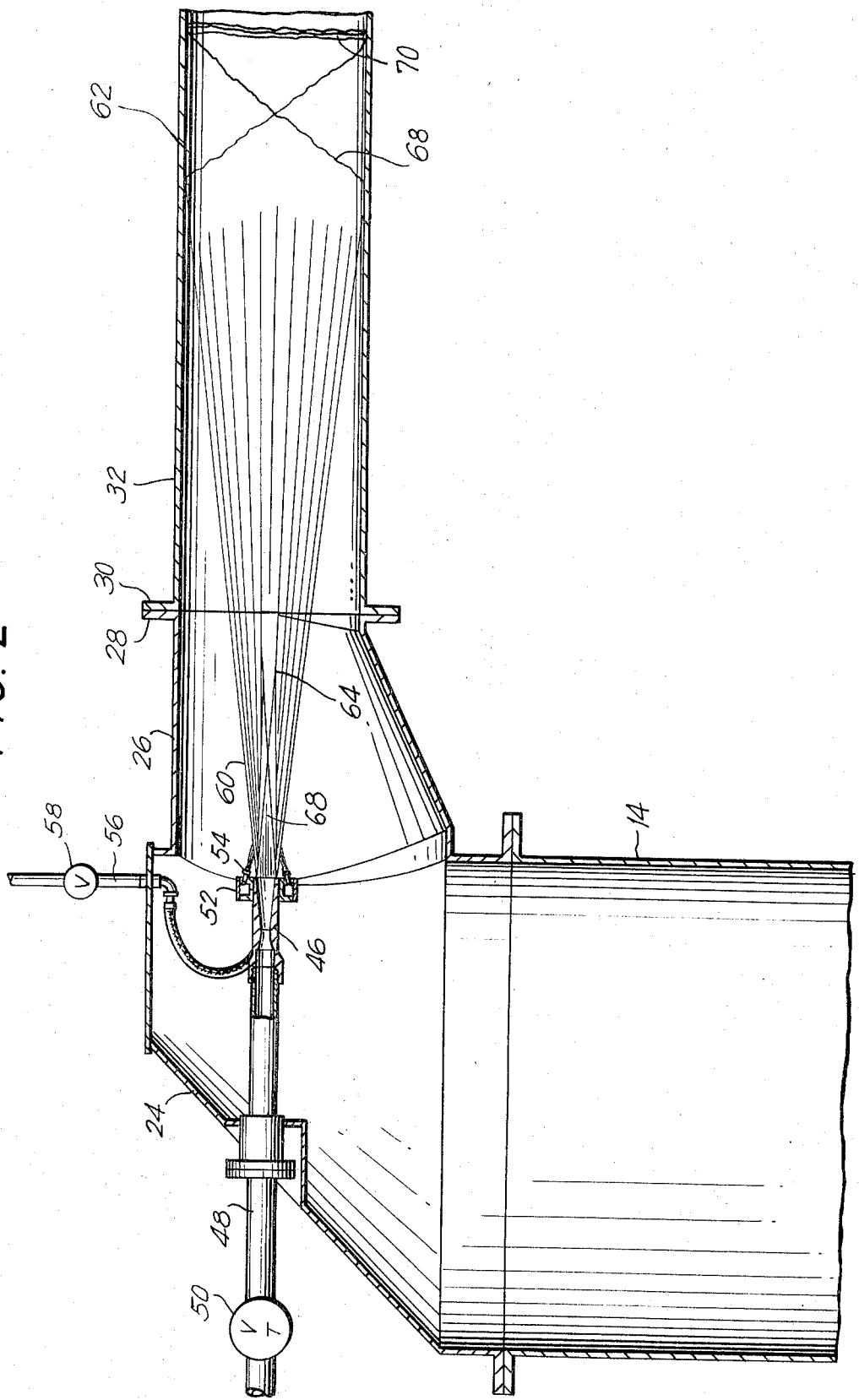
FIG. 2 is an enlarged elevation in cross-section showing the steam ejector drive and water injector and a portion of the adjoining atomizer and mixing tube.
Figure 3:
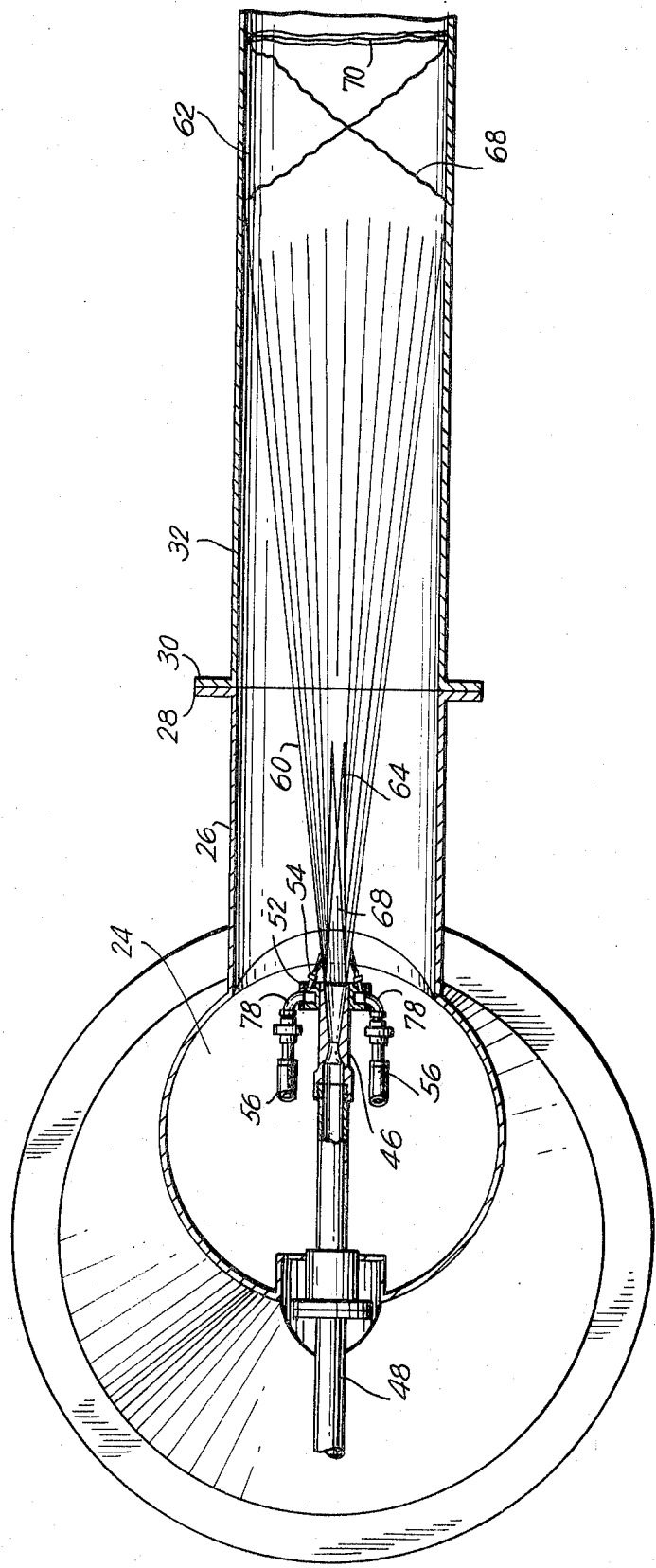
FIG. 3 is a plan view in cross-section showing further details of the apparatus illustrated in FIG. 2.

FIGS. 2 and 3 show, in elevation and plan, respectively, the cone of expanding steam 60 issuing from the exit of the steam nozzle 46 and further expanding as it passes along the mixing tube until it impinges on the wall of the mixing tube 32 at the "hook-up" point 62.

When steam which is substantially in the dry saturated state is expanded through a well-designed converging-diverging nozzle into a region of approximately atmospheric pressure, it will continue to expand in a generally conical shape 60 having an included cone angle substantially equal to the included angle of the diverging portion of the steam nozzle. When the pressure impressed upon the nozzle exceeds the critical pressure ratio and the critical pressure exceeds the nozzle exit static pressure, the velocity of the steam exiting the nozzle will be supersonic at the exit plane of the nozzle. It has also been found that the steam exiting the nozzle will contain a central supersonic core 64. It is believed that the supersonic core 64 contains a number of characteristic "diamonds" 68 formed by oblique shock waves which eventually terminate in a normal shock wave 70. In the core region, it is believed that the highest supersonic velocities exist and that, in this region, the velocities are constant across the cross-section. In the regions outside the supersonic core 64 but within the cone of expandinig steam 60, the velocities are also supersonic though the velocity profile across the cross-section of the jet does not remain constant. In general, the velocity decreases as the distance from the nozzle exit to the "hook-up" point 62 increases and as the point under consideration approaches the inter-facial region which separates the expanding cone of steam 60 from the carrier gases passing into or through the mixing tube 32. As the interfacial region develops, it eventually attaches firmly to the wall at the hook-up point. Before the hook-up point 62 the pressure at the mixing tube wall is negative while after the hook-up point the pressure at the wall becomes positive.

When the steam nozzle and mixing tube are properly designed and proportioned, the cone of expanding steam 60 strikes the wall of the mixing tube 32 with sufficient force so as to attach firmly thereto. Under these conditions, the steam jet acts as a continuous piston with respect to the mixing tube 32 and forms an effective pump. Due to the firm attachment between the steam jet and the mixing tube 32, the aspirated carrier gases are effectively pumped down the mixing tubes. In short, when the steam nozzle and mixing tube tube. properly designed, an effective steam-ejector pump is created.

It is believed that when the kinetic energy of the expanding jet of steam is sufficiently high, the oblique shock system 68 will be terminated by the normal shock wave 70. in the region of the hook-up point 62 on the mixing tube 32. The result of a normal shock wave is an abrupt discontinuity in pressure which is reflected in a change from supersonic to subsonic flow conditions. Thus, it is believed that from and after the location in the mixing tube 32 where the normal shock wave 70 appears, the flow becomes subsonic.

Due to the fact that the oblique and normal shock waves represent an abrupt pressure discontinuity, a high degree of turbulence and concomitant mixing occur in the regions of the normal and oblique shocks.

Figure 5:
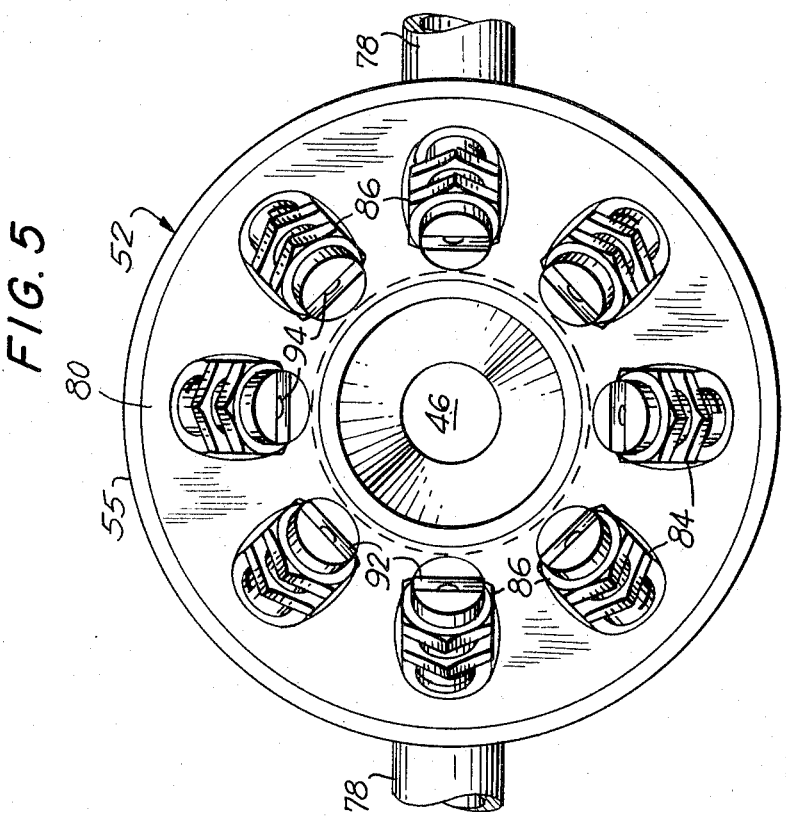
FIG. 5 is an end view of the apparatus shown in FIG. 4.
Figure 6:
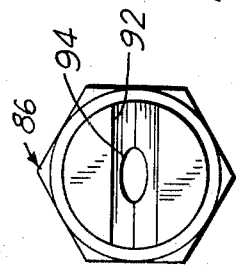
FIG. 6 is an enlarged view taken along line 6—6 of FIG. 4.
Figure 4:
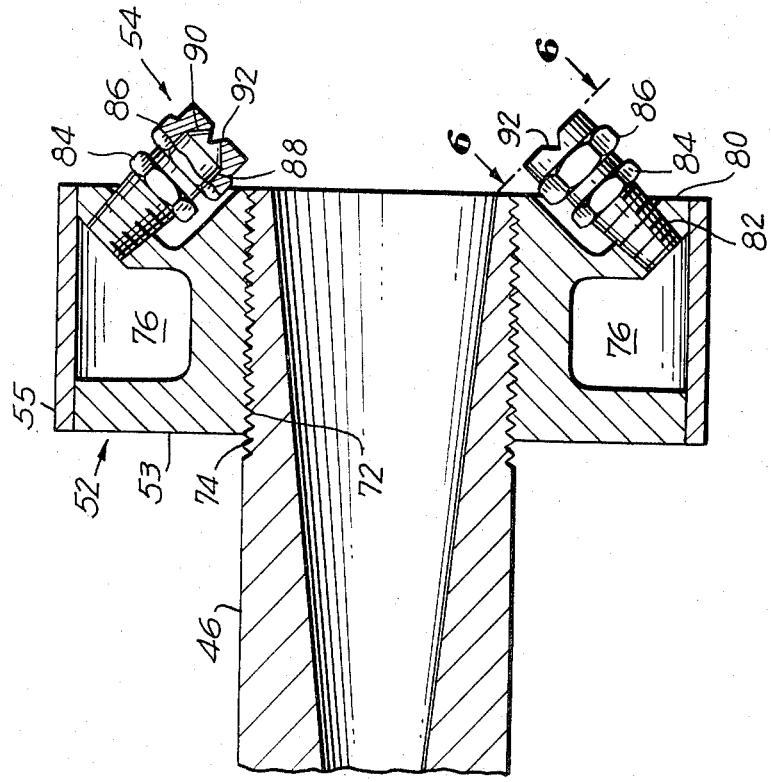
FIG. 4 is a further enlarged view showing in cross-section a portion of the diverging section of the steam nozzle and the water injector and its associated nozzles.

FIGS. 4, 5 and 6 relate to the water injector 52 and the nozzles 54. FIG. 4 shows the diverging portion of the steam nozzle 46 and the adjoining water injector 52. The injector 52 is generally in the form of a ring member 53 internally threaded at 72 to mate with threads 74 formed on the exterior of the nozzle 46, and contains an annular cavity 76 which communicates through fittings 78 with the water lines 56. The annular cavity 76 is closed by a band 55 welded to the outer periphery of the ring member 53. In the front face 80 of the ring member 53 a plurality of tapped holes 82 are formed to receive nozzle adaptors 84 which may be disposed at any predetermined angle with respect to the axis of the steam nozzle 46. The nozzle adaptors receive nozzles 86. As shown in FIG. 4 the nozzles 86 are formed with a cylindrical bore 88 which terminates in a conical bore 90. The flat front face of the nozzle 86 is provided with a vee-slot 92 which intersects the conical bore 90 so as to define an elliptical orifice 94. The effect of this design is to provide a jet spray which is relatively flat in the direction of the minor axis of the elliptical orifice 94 but spread in the direction of the major axis of the elliptical orifice 94. Of course, by variations in the depth and angle of the vee-slot 92, various fan jet shapes can be produced as desired. FIG. 5 illustrates an end view of the apparatus shown in FIG. 4 and shows that the minor axis of the elliptical orifice 94 of each nozzle 86 is oriented so as to intersect with the axis of the steam nozzle 46. While nozzles designed to form a fan-jet spray are shown in FIGS. 4, 5 and 6, it will be appreciated that other types of nozzles may also be used. Thus, it is possible, for example, to use nozzles designed to form conical jet sprays or cylindrical or "pencil" jets.

Figure 7B:
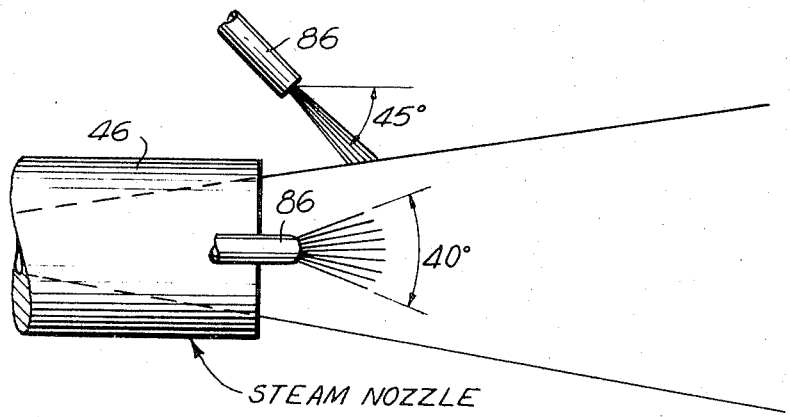
FIGS. 7A and 7B are diagrammatic drawings showing the spray patterns produced by the steam nozzle and flat spray injector nozzles located at 15° and 45°, respectively, relative to the axis of the steam nozzle.
Figure 7A:
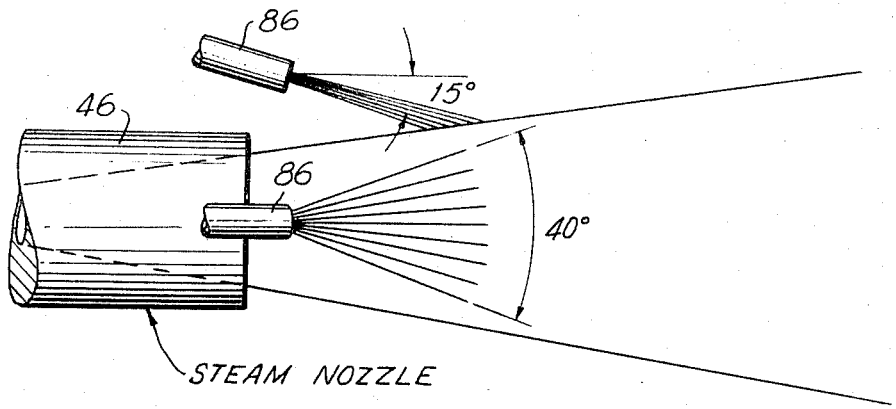

FIGS. 7A and 7B illustrate in diagrammatic form the relationship between the spray patterns of the steam nozzle and the water injection nozzles at different orientations of the flat spray water injection nozzles and the steam nozzle. On these figures it will be appreciated that, for clarity of illustration, only two injection nozzles are portrayed, though as shown in FIG. 5, a plurality of such nozzles is intended.

Figure 8B:
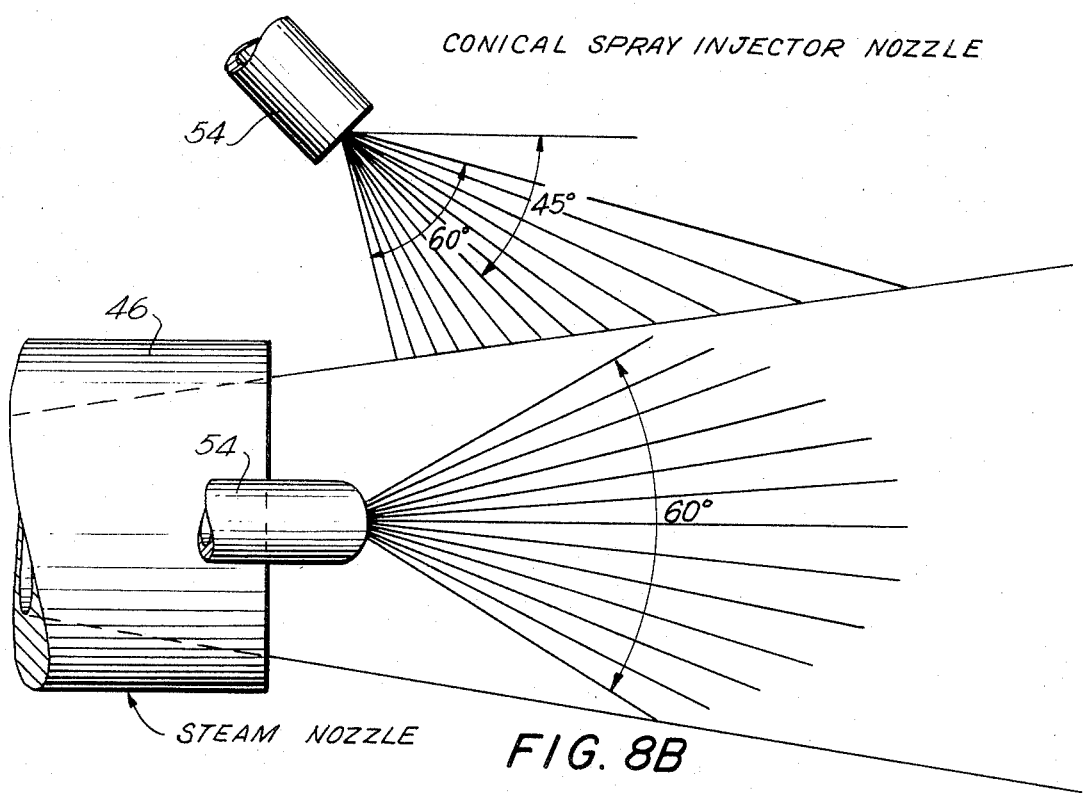
FIGS. 8A and 8B are diagrammatic drawings showing the spray patterns produced by the steam nozzle and conical spray injector nozzles located at 0° and 45°, respectively, relative to the axis of the steam nozzle.
Figure 8A:
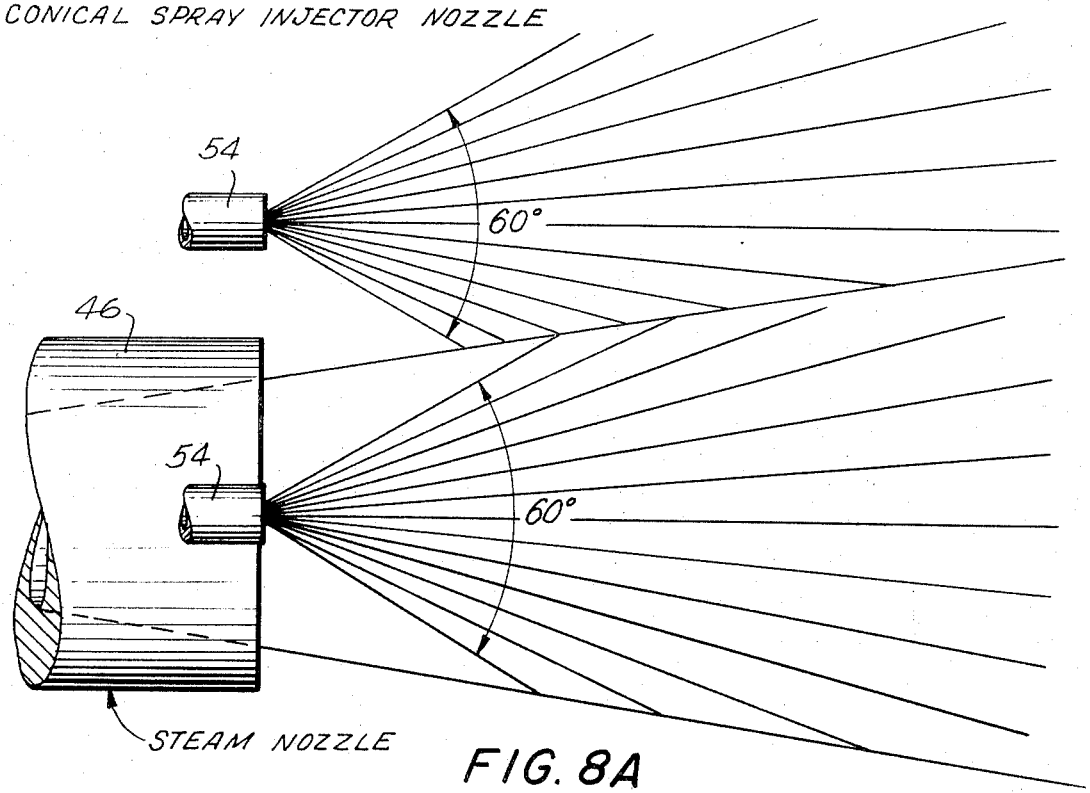

FIGS. 8A and 8B are similar to FIGS. 7A and 7B but illustrate the spray patterns generated by conical spray nozzles designed to produce axisymmetrical jet sprays with a 60° dispersion angle. The conical spray nozzles are similar in construction to the fan jet nozzles described above except that they are formed with a circular orifice and an appropriate swirl device to create the conical spray pattern.

It will be appreciated that both the fan jet and the conical nozzle can be provided with various sized orifices and various angles of dispersion as may be desired by the designer. In addition, nozzles may be designed which produce a cylincrical or pencil jet, if desired.

As noted above, in order to provide the maximum efficiency of particulate collection, it is necessary to form a large number of small droplets having a maximum velocity relative to the particulate contained in the carrier gas. With this objective in mind, it is apparent that it would be beneficial to atomize the injection water by mechanical means as effectively as possible. This can be done by utilizing a plurality of relatively small nozzles designed to form atomizing sprays and operated at relatively high pressures. Applicants' experimental work has confirmed that, for a fixed mass of injection water, it is more effective to utilize small nozzles driven at high pressure than relatively larger nozzles driven at low pressure.

While the injector nozzle design and operating pressure are primary parameters which control the mechanical atomization of the water and these means are adequate to produce relatively small droplets, e.g. droplets in the size range of 100–200 microns, other means must be provided to form the smaller droplets required to impact and collect the submicron sized particulate.

The supersonic steam jet is admirably suited to this latter purpose, particularly when the mechanically atomized droplets are introduced into the jet so that a shearing and atomizing process can take place adjacent the nozzle exit where the maximum reaction and retention times are available. While it is important to subject the water droplets to the high energy steam, it is equally important that undue disturbance of the steam jet be avoided so as to minimize losses in the pumping power of the jet.

A compromise between these conflicting requirements can best be attained by injecting the water into the steam jet at a relatively large angle and over as large a portion of the expanding steam cone as possible without, however, penetrating into the central supersonic core of the jet of steam whereby the steam jet would be weakened so as to affect the ability of the jet to "hook-up" to the mixing tube and to effectively perform its pumping function.

While the conical spray nozzles which contain a swirl device designed to produce a relatively solid conical spray are effective to mechanically atomize water and direct the atomized droplets toward the steam jet, such nozzles may easily become clogged with particulate matter or other impurities contained in the raw water used for the water injector. On the other hand, the fan jet nozzles are relatively insensitive to such particulate matter and, when properly selected to utilize the shearing capacity of the steam jet, are effective to provide adequate primary mechanical atomization and to promote effective secondary shearing atomization by the steam jet.

Where, as in the present apparatus, steam nozzles are provided with a 12° included divergent cone angle, the maximum secondary shearing atomization would be attained by mounting the injector nozzle at an angle of 84° to the axis of the steam nozzle. Lesser angles, such as 45°, are also effective although the secondary atomization through shearing is somewhat decreased. When the injection angle is decreased to the vicinity of 15°, the injected water tends to reflect from the surface of the steam jet and secondary atomization is hampered. Of course, the same result occurs when conical spray nozzles are used at small angles, as shown in FIG. 8A, since a substantial portion of the injected water does not immediately contact the steam jet.

Another type of spray nozzle that could be used is the so-called pencil nozzle which can easily be precisely directed into the steam jet. However, this nozzle produces little primary mechanical atomization and tends to penetrate into the supersonic core of the steam jet and thus is generally undesirable.

It is apparent that secondary shearing atomization may be produced by injecting the primary atomized droplets at any point in the outer or interfacial region of the steam jet between the nozzle exit and the hook-up point. However, in order to promote the collection of particulate by impaction and mixing, it is desirable to maximize the time available for these processes. Accordingly, it is preferable to inject the primary atomized droplets relatively close to the nozzle exit where the velocity of the steam jet is also at a maximum.

In performing the process of the present invention, applicants have developed an apparatus of the type shown in FIG. 1 which was designed to handle about 1,000 pounds per minute of a carrier gas, such as the exhaust gas from an open hearth furnace. The exhaust gas contained particulate matter, including a large amount of submicron sized iron oxide particles at a dust loading of up to three to five grains per standard cubic foot (scf). The mixing tube 32 was 18 inches in diameter and about 16½ feet long and communicated with twin cyclone separators 38 which were 4 feet in diameter and about 12 feet high. The cyclone stack was 30 inches in diameter and about 10 feet high and extended about 4 feet above the top of the cyclone.

Applicants have designed four steam nozzles to function in conjunction with the mixing tube and cyclone in order to perform operations at varying steam pressure. The dimensions of these nozzles, designated as nozzles 1 through 4, are shown in Table 1:

TABLE 1

| Nozzle Number | Throat Diameter (inches) | Divergence Angle ° | Designed Pressure psia | Operating Pressure Range psia |
|---|---|---|---|---|
| 1 | .593 | 12° | 550 | 550–320 |
| 2 | .832 | 12° | 320 | 320–190 |
| 3 | 1.175 | 12° | 190 | 190–110 |
| 4 | 1.729 | 12° | 110 | 110–63 |

Performance data for nozzles 1 through 3 is tabulated in Table 2 below and plotted in graphical form on FIG. 9:

From FIG. 9, it is apparent that adequate pumping can be obtained at widely varying steam pressures provided only that a properly designed nozzle is utilized. In the present instance, the throat diameter was designed for the maximum operating pressure while the exit diameter of the nozzle was sized to permit operation within a desired pumping range.

Figure 10A:
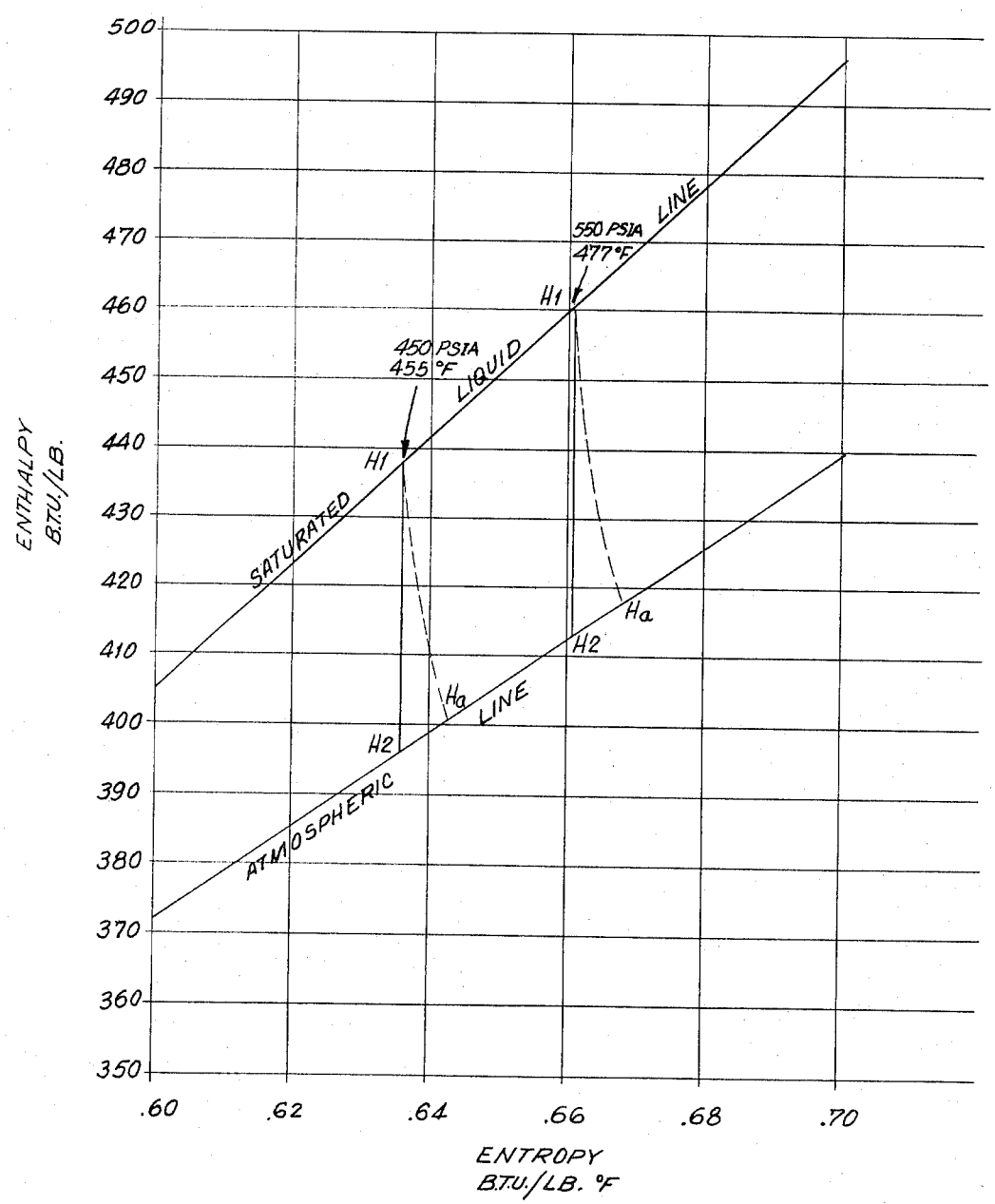
FIG. 10A is a portion of the liquid water region of the Mollier diagram applicable to a hot-water ejector drive.
Figure 10B:
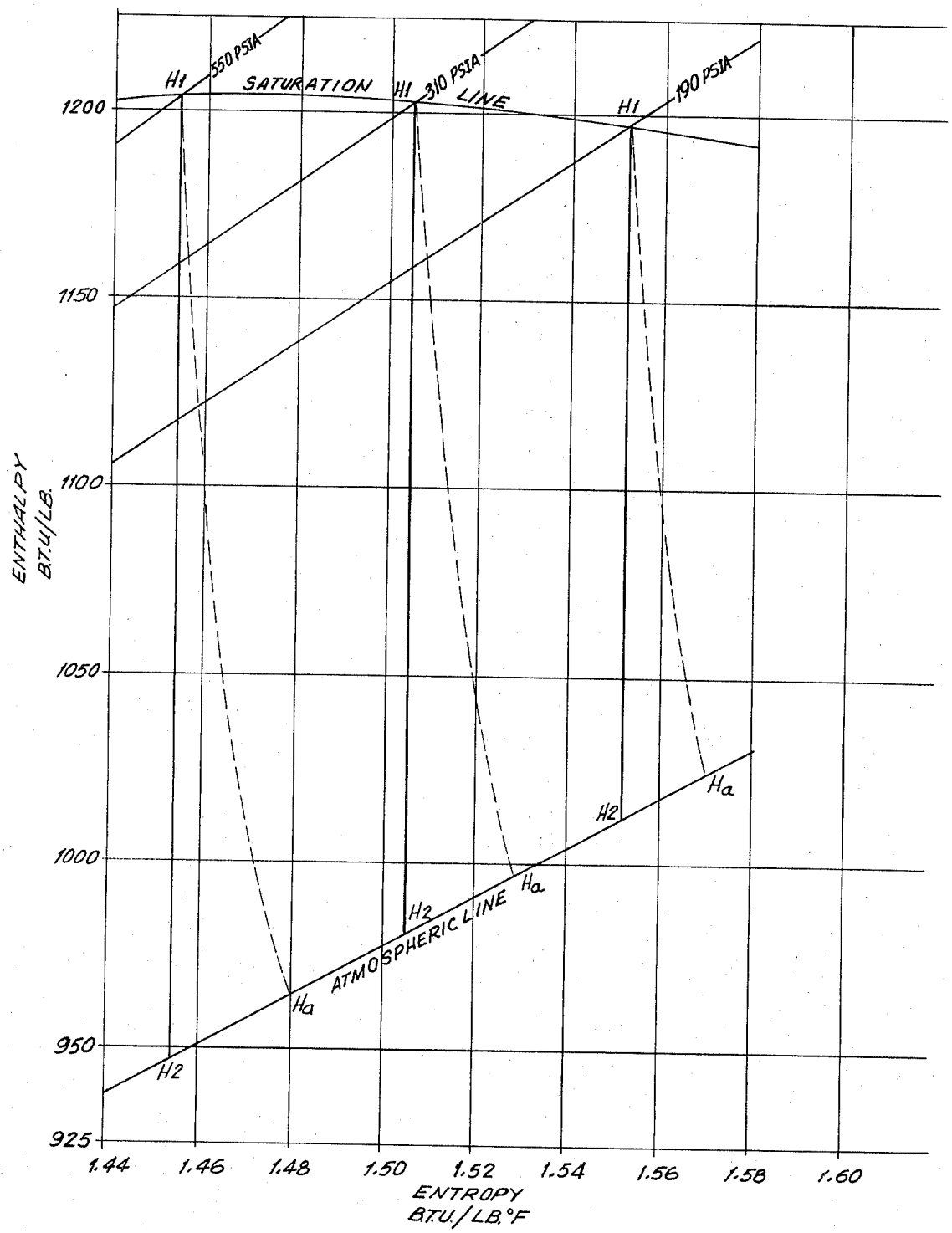
FIG. 10B is a portion of the water vapor region of the Mollier diagram applicable to the steam-ejector drive.

FIG. 10B is a portion of the Mollier diagram showing a part of the water vapor region covering the pressure ranges investigated here. The Mollier diagram relates the enthalpy or total heat content of steam to the entropy of the steam and is a convenient diagram upon which to represent the expansion of steam through a nozzle. Within the range of pressures here considered, the enthalpy of the saturated steam ($H_1$) is almost constant, ranging from 1,198 BTU/pound at 190 psia to 1,204 BTU/pound at 550 psia. An isentropic expansion to atmospheric pressure would result in enthalpies ($H_2$) ranging from 1,012 BTU/pound at 190 psia to 947 BTU/pound at 550 psia. Thus, the heat energy theoretically available to accelerate the steam ($\Delta H$) ranges from 186 BTU/pound at 190 psia to 257 BTU/pound at 550 psia. The theoretical isentropic expansion cannot be obtained and the actual process with a well-designed nozzle follows the dashed curves on FIG. 10B to produce an available energy ($\Delta H_a$) ranging from 173 BTU/pound at 190 psia to 239 BTU/pound at 550 psia.

A comparison of the available energy through the use of the hot-water ejector drive operating in the same pressure range can be made by reference to the portion of the Mollier diagram for liquid water shown in FIG. 10A. This shows that the total heat content (enthalpy) of saturated water at 550 psia is 461 BTU/pound and the enthalpy at atmospheric pressure is 413 BTU/pound thus providing a theoretical amount of available energy ($\Delta H$) of 48 BTU/pound and an actual amount of energy available from a well-designed nozzle of about 43 BTU/pound.

The disparity in the energies available from steam and water at the same pressures and temperatures provides an insight into the reasons for the improved performance of the present process utilizing steam as a driving means and as a source of energy for the secondary shearing atomization process. As a result of the large amounts of energy available, the steam flow will be at supersonic velocities which may reach Mach 2 or more in the central core of constant velocity steam whereas in the surrounding portions of the jet, the velocities will range from transonic levels to velocities approaching the core velocity. Of course, in the outer boundaries of the steam jet where the water droplets are concentrated, a high degree of mixing and turbulence will be present. Depending upon the energy and velocity of the steam jet, one or more strong shock waves may be formed at or beyond the hook-up point 62 and these shock waves will provide additional turbu-

TABLE 2

| Nozzle 1 | | Nozzle 2 | | Nozzle 3 | |
|---|---|---|---|---|---|
| Steam Flow Lbs./Min. | Gas Flow Lbs./Min. | Steam Flow Lbs./Min. | Gas Flow Lbs./Min. | Steam Flow Lbs./Min. | Gas Flow Lbs./Min. |
| 118 | 1025 | 140 | 1013 | 164 | 1010 |
| 95 | 865 | 108 | 820 | 138 | 893 |
| 71 | 651 | 83 | 645 | 124 | 786 |
| 55 | 459 | 83 | 603 | 108 | 687 |
|  |  |  |  | 95 | 579 | lence and mixing within the mixing tube which enhance the capture of particulate by the water droplets and the growth and agglomeration of these droplets. Beyond the normal shock wave 70 (see FIGS. 2 and 3) the flow will be essentially turbulent and subsonic and the presence of the injected water will promote condensation of the steam to form additional droplets or to enlarge existing droplets. In this region, the velocity of the water droplets will again be greater than that of the gas so that both the processes of condensation and impaction may be operating for the capture of the particulate although the principal function of this portion of the mixing tube is to ensure sufficient droplet growth to enable the water as droplets to be separated from the gas in the cyclone separators.

Applicants have successfully utilized the apparatus shown schematically in FIG. 1 to collect the particulate from open hearth exhaust gases. Typical data from these tests is set forth in Table 3 below:

loading represents the gas loading at the exit of the atomizer 14. Thus, the removal efficiencies reported are the actual removal efficiencies obtained in the mixing tube 32 and cyclones 38. The outlet grain loading of the carrier gas was based upon "grab" samples of the gas drawn through a standard 2 inch filter into an evacuated flask. The filters obtained in this manner were compared with filters obtained using large samples of gas and standard grain loading measurement techniques to check the validity of the grab sample technique. Inlet grain loadings were determined from a grab sample of the slurry exiting the cyclone 38 through the drain 42.

In order to determine whether or not the atomizer 14 was essential to the proper functioning of the process, an additional group of tests was conducted with the atomizer water sprays 16 inoperative. In this regime, relatively little particulate removal was attained in the atomizer but the overall performance of the system was Table 3

Typical Particulate Removal Data (Atomizing Chamber Water On)

| Run No. | Inlet Gas Flow Lbs./Min. | Steam Nozzle No. | Steam Press. PSIA | Steam Flow Lbs./Min. | Alpha Steam Lbs.St./Lbs. Gas | Injected Scrubbing Water Lbs./Min. | Gas Particulate Inlet Gr./SCF | Gas Particulate Outlet Gr./SCF | Removal Efficiency Per cent |
|---|---|---|---|---|---|---|---|---|---|
| 520-2 | 1004 | 3 | 185 | 162 | .161 | 97 | 0.82 | 0.010 | 99.1 |
| 520-4 | 1010 | 3 | 190 | 164 | .162 | 222 | 0.82 | 0.010 | 99.1 |
| 521-7 | 895 | 3 | 160 | 138 | .154 | 195 | 0.68 | 0.001 | 99.9 |
| 522-2 | 786 | 3 | 145 | 124 | .158 | 122 | 0.96 | 0.003 | 99.7 |
| 523-2 | 679 | 3 | 120 | 103 | .152 | 182 | 2.40 | 0.020 | 99.2 |
| 523-5 | 570 | 3 | 105 | 90 | .157 | 232 | 1.61 | 0.030 | 98.2 |
| 525-4 | 1013 | 2 | 320 | 140 | .132 | 222 | 2.10 | 0.005 | 99.8 |
| 526-1 | 695 | 2 | 200 | 87 | .126 | 135 | 0.52 | 0.001 | 99.8 |
| 527-4 | 820 | 2 | 245 | 108 | .132 | 210 | 2.90 | 0.025 | 99.0 |
| 527-6 | 836 | 2 | 250 | 109 | .131 | 121 | 2.85 | 0.050 | 98.2 |
| 528-3 | 645 | 2 | 190 | 83 | .129 | 213 | 3.00 | 0.030 | 99.0 |
| 529-3 | 1025 | 1 | 540 | 118 | .115 | 215 | 1.70 | 0.010 | 99.4 |
| 530-2 | 865 | 1 | 435 | 95 | .110 | 330 | 1.56 | 0.015 | 99.0 |
| 530-7 | 862 | 1 | 440 | 96 | .111 | 325 | 1.21 | 0.030 | 97.5 |
| 531-2 | 649 | 1 | 325 | 71 | .110 | 330 | 2.09 | 0.030 | 98.6 |
| 531-3 | 651 | 1 | 325 | 71 | .109 | 270 | 1.47 | 0.040 | 97.3 |
| 532-1 | 459 | 1 | 260 | 55 | .120 | 180 | 1.47 | 0.025 | 99.0 |

The data in Table 3 was taken with the water sprays 16 of the atomizer 14 in operation but the inlet grain still highly successful. Typical data from these tests are shown in Table 4 below:

Table 4

Typical Particulate Removal Data (Atomizing Chamber Water Off)

| Run No. | Inlet Gas Flow Lbs./Min. | Steam Nozzle No. | Steam Press. PSIA | Steam Flow Lbs./Min. | Alpha Steam Lbs.St./Lbs. Gas | Injected Scrubbing Water Lbs./Min. | Gas Particulate Inlet Gr./SCF | Gas Particulate Outlet Gr./SCF | Removal Efficiency Per cent |
|---|---|---|---|---|---|---|---|---|---|
| 527-7 | 843 | 2 | 245 | 108 | .127 | 121 | 0.39 | .005 | 98.8 |
| 527-8 | 870 | 2 | 245 | 108 | .124 | 210 | 2.81 | .010 | 96.4 |
| 527-10 | 980 | 2 | 250 | 109 | .120 | 305 | 3.55 | .030 | 99.2 |
| 527-11 | 916 | 2 | 245 | 108 | .118 | 370 | 3.25 | .030 | 99.1 |
| 530-5 | 789 | 1 | 440 | 96 | .121 | 175 | 1.50 | .030 | 98.0 |
| 530-6 | 838 | 1 | 435 | 95 | .114 | 251 | 2.18 | .020 | 99.1 |
| 530-7 | 862 | 1 | 440 | 96 | .111 | 325 | 1.21 | .030 | 97.5 |
| 530-8 | 990 | 1 | 440 | 96 | .097 | 397 | 1.36 | .025 | 98.2 |
| 537-1 | 1195 | 1 | 540 | 120 | .100 | 445 | 3.07 | .025 | 99.2 |
| 537-2 | 1137 | 1 | 540 | 120 | .106 | 297 | 2.24 | .025 | 98.9 |
| 544-1 | 1115 | 3 | 190 | 164 | .147 | 437 | 2.06 | .015 | 99.3 |
| 544-2 | 1130 | 3 | 192 | 166 | .147 | 368 | 1.65 | .015 | 99.1 |
| 544-3 | 1083 | 3 | 190 | 164 | .151 | 292 | 2.27 | .015 | 99.3 |
| 544-4 | 984 | 3 | 190 | 164 | .167 | 217 | 1.47 | .050 | 97.1 |
| 544-5 | 1031 | 3 | 190 | 164 | .159 | 227 | 1.87 | .050 | 97.3 |
| 544-6 | 1098 | 3 | 190 | 164 | .149 | 292 | 2.00 | .025 | 98.7 |

In view of the highly successful results obtained in the tests for particulate removal, applicants performed a still further group of tests to determine whether or not the process of the present invention could be applied to the removal of both particulate matter and sulfur dioxide gas.

The chemistry of the removal of sulfur dioxide is set forth in applicants' copending application Ser. No. 291,007 filed Sept. 21, 1972. The techniques for the injection of sulfur dioxide into the exhaust gas from the open hearth furnace are similar to those described in the above application. Of course, the open hearth exhaust gas contains about 10% carbon dioxide, which applicants have previously discovered, has an adverse effect on sulfur dioxide removal particularly when lime is used as the chemical reagent.

In the sulfur dioxide removal tests, applicants utilized lime as calcium hydroxide ($Ca(OH)_2$), mixtures of lime and sodium hydroxide (NaOH) and sodium hydroxide alone. The results of these tests showed that when the chemical reagent was introduced as a slurry or solution with the untreated injection water through the water injector 52, satisfactory removal of sulfur dioxide was attained. When lime alone was used, up to about 90% of the $SO_2$ was removed while with sodium hydroxide, almost complete removal was attained. With mixtures of lime and sodium hydroxide, the removal efficiency was intermediate the removal efficiencies attained through the use of lime and sodium hydroxide alone. In the event that the carrier gases contain organic odors, an oxidant such as potassium permanganate may be added to the injection water. The highly turbulent mixing zones created by the present process will be effective to promote the oxidizing reactions required to effect the removal of such organic odors. It will also be appreciated that the condensing conditions prevalent in the mixing tube downstream of the hook-up point 62 will promote the condensation of any condensible vapors present in the turbulent mixture of gas, steam and water.

Figure 11:
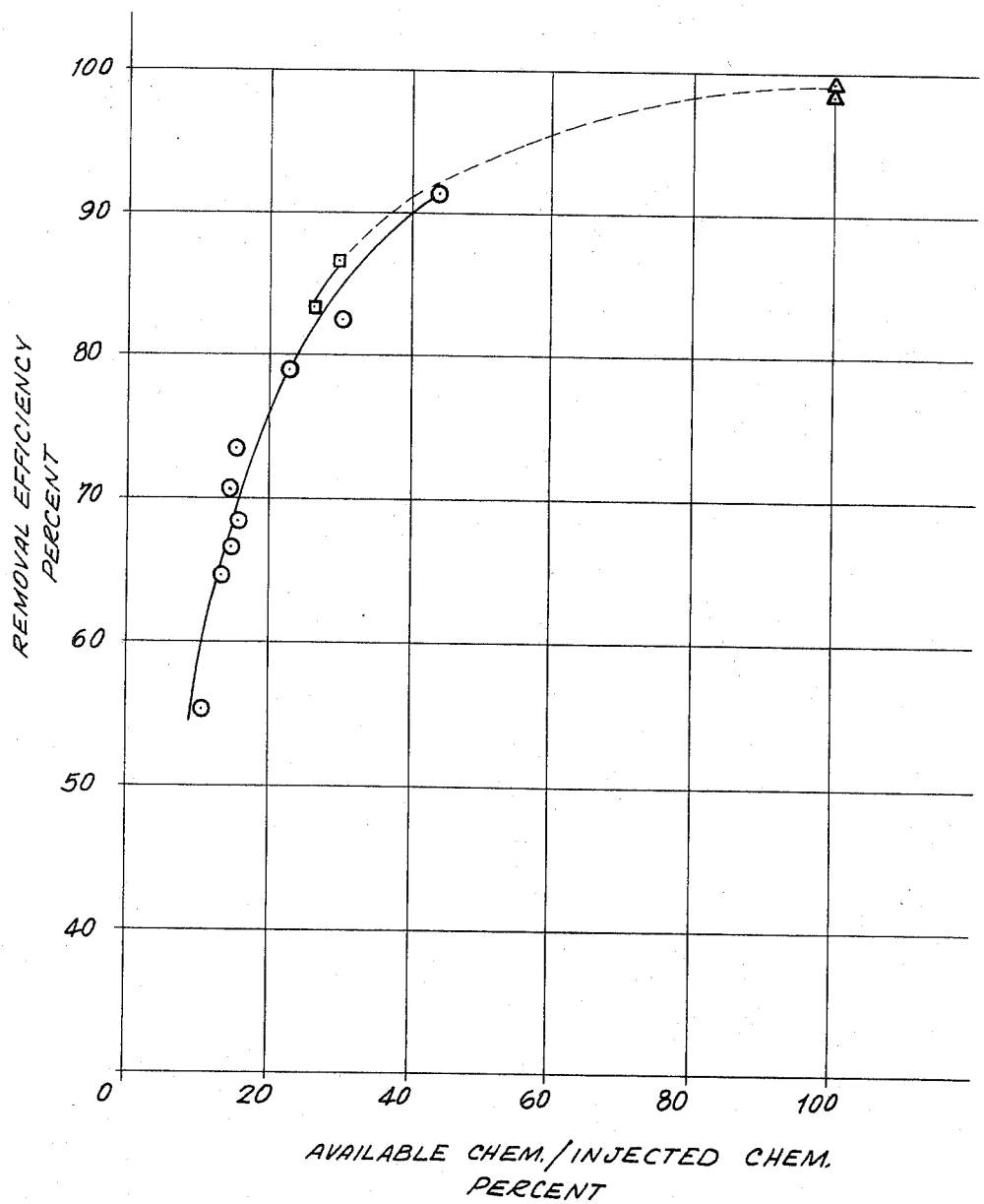
FIG. 11 is a graph showing the sulfur dioxide removal efficiency as a function of the soluble chemical reagent.

Typical data for the sulfur dioxide tests is set forth in Table 5 below and shown graphically in FIG. 11.

the abscissa of FIG. 11, the available reagent was utilized in order to account for the solubility of the lime contained in the lime slurry. The available lime was calculated on the basis of 0.17% solubility of lime in cool water.

It is apparent from the data presented herein that applicants' process according to the present invention is highly effective both for the removal of particulate and for the removal of acidic gases such as sulfur dioxide. The preferred embodiment of the apparatus disclosed herein comprises an apparatus designed to handle approximately 1,000 pounds per minute of gas. Applicants contemplate that any number of modules of the apparatus may be operated in parallel to accommodate larger quantities of gas, and it is also apparent from the data disclosed that quantities of gas substantially in excess of 1,000 pounds per minute can be pumped by the present module without impairment of the removal efficiency.

It will also be apparent to those skilled in the art that the apparatus module herein disclosed may be scaled up or down in size as may be desired for any particular installation through the application of well-known principles. For example, the mixing tube diameter and the mixing tube length up to the hook-up point are a function of the square root of the ratio of the desired flow and the designed flow rate of the present module. The cyclone diameter is a function of the exit velocity of the droplets issuing from the mixing tube which is related to the length of the mixing tube beyond the hook-up point. As the capacity of the cyclone depends upon its diameter, the number of cyclones required may be determined when the diameter has been established. Similar considerations apply to the sizing of the remaining portions of the apparatus. Other equipment configurations are also possible within the scope of the present invention. For example, the steam ejector and mixing tube may be vertically oriented and primary water separation performed by curved vanes or other forms of inertial impact separators. The vertical design may be desirable either where, due to the high module capacity the mixing tube becomes relatively long or where the ground space for the installation is limited. The vertical

TABLE 5

TYPICAL SULFUR DIOXIDE REMOVAL DATA

| Run No. | Gas Flow Lb./Min. | Driver Steam Flow Lb./Min. | Driver Steam Press. Psia | Driver Steam Alpha Lb.St. Lb.Gas | Inlet Lb./Min. | $SO_2$ PPM Vol. | Chem. Inj. Type | Chem. Inj. Lb./Min. | $SO_2$ Out Lb./Min. | $SO_2$ Out PPM Vol. | Equiv. Ratio | Removal Eff. % | Slurry Injected Alpha Lb./Min. | Slurry Injected Alpha Lbs. Water Lb.Gas |
|---|---|---|---|---|---|---|---|---|---|---|---|---|---|---|
| 558-2 | 1067 | 167 | 190 | .178 | 1.045 | 445 | (1) | 1.202 | .221 | 94 | .995 | 78.9 | 162 | .152 |
| 558-3 | 1050 | 163 | 185 | .176 | 1.028 | 445 | (1) | 1.202 | .180 | 78 | 1.011 | 82.5 | 215 | .205 |
| 558-4 | 1050 | 165 | 185 | .176 | 1.028 | 445 | (1) | 1.202 | .122 | 53 | 1.011 | 91.5 | 311 | .296 |
| 559-2 | 987 | 155 | 165 | .167 | 2.171 | 1000 | (1) | 2.736 | .632 | 291 | 1.090 | 70.9 | 233 | .236 |
| 559-3 | 987 | 155 | 165 | .167 | 2.038 | 938 | (1) | 2.736 | .541 | 249 | 1.161 | 73.5 | 281 | .285 |
| 560-2 | 987 | 156 | 165 | .167 | 2.519 | 1160 | (1) | 4.140 | 1.129 | 520 | 1.422 | 55.2 | 251 | .254 |
| 563-3 | 987 | 158 | 166 | .168 | 2.519 | 1160 | (1) | 4.140 | .656 | 302 | 1.422 | 74.0 | 377 | .382 |
| 561-2 | 997 | 153 | 168 | .169 | 1.660 | 757 | (2) | 1.451 | .022 | 10 | .699 | 98.7 | 263 | .264 |
| 561-3 | 982 | 152 | 163 | .166 | 1.635 | 757 | (2) | 1.451 | .009 | 4 | .710 | 99.5 | 437 | .445 |
| 562-2 | 1003 | 153 | 170 | .169 | 2.674 | 1102 | (3) | 2.846 | .406 | 184 | .921 | 83.3 | 224 | .223 |
| 562-3 | 1003 | 147 | 170 | .169 | 2.674 | 1102 | (3) | 2.846 | .324 | 147 | .921 | 86.7 | 359 | .358 |
| 563-2 | 987 | 144 | 165 | .167 | 3.257 | 1500 | (1) | 5.389 | 1.151 | 530 | 1.431 | 64.7 | 422 | .428 |
| 563-3 | 987 | 144 | 165 | .167 | 3.123 | 1437 | (1) | 5.389 | 1.040 | 479 | 1.493 | 66.7 | 422 | .428 |
| 563-4 | 987 | 144 | 165 | .167 | 2.952 | 1358 | (1) | 5.389 | .932 | 429 | 1.608 | 68.4 | 422 | .428 |
| 563-5 | 987 | 144 | 165 | .167 | 2.826 | 1300 | (1) | 5.389 | .832 | 382 | 1.649 | 70.5 | 422 | .428 |
| 563-6 | 987 | 144 | 165 | .167 | 2.663 | 1225 | (1) | 5.389 | .699 | 322 | 1.750 | 73.7 | 422 | .428 |

Notes:
(1) Lime ($Ca(OH)_2$) Slurry
(2) Sodium Hydroxide (NaOH) Solution
(3) 20% NaOH; 80% $Ca(OH)_2$ Slurry In FIG. 11, the $SO_2$ removal efficiency is plotted as a ratio of the overall efficiency divided by the equivalent ratio as the ordinate in order to account for variations in the amount of $SO_2$ injected into the system. For injector and mixing tube design may also be desirable for small portable units.

The terms and expressions which have been employed are used as terms of description and not of limitation and there is no intention, in the use of such terms and expressions, of excluding any equivalents of the features shown and described or portions thereof, but it is recognized that various modifications are possible within the scope of the invention claimed.

What is claimed is:

1. A process for the removal of particulate matter from a carrier gas comprising driving the carrier gas through an elongate mixing tube and forming a turbulent mixture of steam, atomized water and particulate-containing carrier gas in said mixing tube by (a) continuously supplying pressurized steam to the inlet of the nozzle of a steam ejector and expanding said steam through said nozzle to form a jet of said steam directed into the mixing tube, (b) forming a series of jet sprays of relatively cold aqueous liquid in a first atomized condition disposed circumferentially about the jet of steam emerging from said nozzle and (c) further atomizing said aqueous liquid by directing said jet sprays into the outer regions of said jet of steam; further mixing the particulate-containing carrier gas with said further atomized aqueous liquid and said steam within the mixing tube, and so regulating the flow of said turbulent mixture through said mixing tube as to provide retention time of said turbulent mixture in said mixing tube sufficient for the formation of aqueous droplets and entrainment of said particulate matter in said droplets and for growth in size of said particulate-containing aqueous droplets, and thereafter separating said particulate-containing aqueous droplets thus grown in size from the remainder of said carrier gas.

2. A process for the removal of particulate matter from a carrier gas comprising driving the carrier gas through an elongate mixing tube and forming a turbulent mixture of steam, atomized water and particulate-containing carrier gas in said mixing tube by (a) continuously supplying pressurized steam to the inlet of the nozzle of a steam ejector and expanding said steam through said nozzle to form a jet of said steam directed into the mixing tube at supersonic velocity and having a central region of uniform velocity and a surrounding region of non-uniform transverse velocity profile, (b) forming a series of jet sprays of relatively cold aqueous liquid in a first atomized condition disposed circumferentially about the jet of steam emerging from said nozzle and (c) further atomizing said aqueous liquid by directing said jet sprays into said surrounding region of said jet of steam; further mixing the particulate-containing carrier gas with said further atomized aqueous liquid and said steam within the mixing tube, and so regulating the flow of said turbulent mixture through said mixing tube as to provide retention time of said turbulent mixture in said mixing tube sufficient for the formation of aqueous droplets and entrainment of said particulate matter in said droplets and for growth in size of said particulate-containing aqueous droplets, and thereafter separating said particulate-containing aqueous droplets thus grown in size from the remainder of said carrier gas.

3. A process for the removal of particulate matter from a carrier gas comprising driving the carrier gas through an elongate cylindrical mixing tube and forming a turbulent mixture of steam, atomized water and particulate-containing carrier gas in said mixing tube by (a) continuously supplying pressurized steam to the inlet of the nozzle of a steam ejector and expanding said steam through said nozzle to form a jet of said steam directed into the mixing tube at supersonic velocity and expanding in generally conical configuration through a portion of the length of said mixing tube and extending to a point within said mixing tube where the outer regions of said jet of steam still moving at supersonic velocity engage the inner surface of said mixing tube to hook up with said mixing tube thus to drive said carrier gas and steam at a decreasing velocity through a portion of the length of said mixing tube and into a portion of the length of said mixing tube wherein at least one shock wave region exists, (b) forming a series of jet sprays of relatively cold aqueous liquid in a first atomized condition disposed circumferentially about the jet of steam emerging from said nozzle and (c) further atomizing and accelerating the droplets of said atomized aqueous liquid to a velocity level above the speed of the particulate in said carrier gas by directing said jet sprays into said outer regions of said jet of steam; further mixing the particulate-containing carrier gas with said droplets of aqueous liquid moving at accelerated speed and said steam within the mixing tube to cause multitudinous collisions between said droplets and said particulate, and so regulating the flow of said turbulent mixture through said mixing tube as to provide retention time of said turbulent mixture within said portion of said mixing tube in which driving at decreasing speed occurs and said portion of said mixing tube wherein said shock-wave region exists sufficient for the formation of aqueous droplets and entrainment of said particulate matter in said droplets and for growth in size of said particulate-containing aqueous droplets, and thereafter separating said particulate-containing droplets thus grown in size from the remainder of said carrier gas.

4. A process for the removal of particulate matter from a carrier gas comprising driving the carrier gas through an elongate mixing tube and forming a turbulent mixture of steam, atomized water and particulate-containing carrier gas in said mixing tube by (a) continuously supplying pressurized steam to the inlet of the nozzle of a steam ejector and expanding said steam through said nozzle to form a jet of said steam directed into the mixing tube at supersonic velocity and having a central region of uniform velocity and a surrounding region of non-uniform transverse velocity profile, (b) forming a series of jet sprays of relatively cold aqueous liquid in a first atomized condition disposed circumferentially about the jet of steam emerging from said nozzle and (c) further atomizing said aqueous liquid by directing said jet sprays into said surrounding region of said jet of steam; further mixing the particulate-containing carrier gas with said further atomized aqueous liquid and said steam within the mixing tube, and so regulating the flow of said turbulent mixture through said mixing tube as to provide retention time of said turbulent mixture in said mixing tube sufficient for the formation of aqueous droplets and entrainment of said particulate matter in said droplets and for growth in size of said particulate-containing aqueous droplets, and thereafter separating said particulate-containing aqueous droplets thus grown in size from the remainder of said carrier gas; said regulating of flow of said turbulent mixture through said mixing tube being effected by (a) regulating the rate of supply of steam to said nozzle to establish desired volumetric rate of driving of said particulate-containing carrier gas through said mixing tube, and (b) regulating the volumetric rate of flow of said aqueous liquid through said series of jet sprays in accordance with any variations in the characteristics such as quantity and particle sizes of said particulate matter carried by said carrier gas.

5. A process for the removal of particulate matter and gaseous sulfur dioxide from a carrier gas comprising driving the carrier gas through an elongate mixing tube and forming a turbulent mixture of steam, atomized water and carrier gas containing particulate matter and gaseous sulfur dioxide in said mixing tube by (a) continuously supplying pressurized steam to the inlet of the nozzle of a steam ejector and expanding said steam through said nozzle to form a jet of said steam directed into the mixing tube, (b) forming a series of jet sprays of relatively cold aqueous liquid containing an alkaline reagent in a first atomized condition disposed circumferentially about the jet of steam emerging from said nozzle and (c) further atomizing said aqueous liquid containing said alkaline reagent by directing said jet sprays into the outer regions of said jet of steam; further mixing the carrier gas with said further atomized aqueous liquid and said steam within the mixing tube, and so regulating the flow of said turbulent mixture through said mixing tube as to provide retention time of said turbulent mixture in said mixing tube sufficient for reaction of sulfur dioxide in said carrier gas with said alkaline reagent for the formation of aqueous droplets of sulfur-containing reaction products and entrainment of said particulate matter in said droplets and for growth in size of said droplets, and thereafter separating said droplets thus grown in size from the remainder of said carrier gas.

6. A process for the removal of particulate matter and gaseous sulfur dioxide from a carrier gas comprising driving the carrier gas through an elongate mixing tube and forming a turbulent mixture of steam, atomized water and carrier gas containing particulate matter and gaseous sulfur dioxide in said mixing tube by (a) continuously supplying pressurized steam to the inlet of the nozzle of a steam ejector and expanding said steam through said nozzle to form a jet of said steam directed into the mixing tube at supersonic velocity and having a central region of uniform velocity and a surrounding region of non-uniform transverse velocity profile, (b) forming a series of jet sprays of relatively cold aqueous liquid containing an alkaline reagent in a first atomized condition disposed circumferentially about the jet of steam emerging from said nozzle and (c) further atomizing said aqueous liquid containing said alkaline reagent by directing said jet sprays into said surrounding region of said jet of steam; further mixing the carrier gas with said further atomized aqueous liquid and said steam within the mixing tube, and so regulating the flow of said turbulent mixture through said mixing tube as to provide retention time of said turbulent mixture in said mixing tube sufficient for reaction of sulfur dioxide in said carrier gas with said alkaline reagent for the formation of aqueous droplets of sulfur-containing reaction products and entrainment of said particulate matter in said droplets and for growth in size of said droplets, and thereafter separating said aqueous droplets thus grown in size from the remainder of said carrier gas.

7. A process for the removal of particulate matter and gaseous sulfur dioxide from a carrier gas comprising driving the carrier gas through an elongate cylindrical mixing tube and forming a turbulent mixture of steam, atomized water and carrier gas containing particulate matter and gaseous-sulfur dioxide in said mixing tube by (a) continuously supplying pressurized steam to the inlet of the nozzle of a steam ejector and expanding said steam through said nozzle to form a jet of said steam directed into the mixing tube at supersonic velocity and expanding in generally conical configuration through a portion of the length of said mixing tube and extending to a point within said mixing tube where the outer regions of said jet of steam still moving at supersonic velocity engage the inner surface of said mixing tube to hook up with said mixing tube thus to drive said carrier gas and steam at a decreasing velocity through a portion of the length of said mixing tube and into a portion of the length of said mixing tube wherein at least one shock wave region exists, (b) forming a series of jet sprays of relatively cold aqueous liquid containing an alkaline reagent in a first atomized condition disposed circumferentially about the jet of steam emerging from said nozzle and (c) further atomizing and accelerating the droplets of said atomized aqueous liquid containing said alkaline reagent to a velocity level above the speed of the particulate in said carrier gas by directing said jet sprays into said outer regions of said jet of steam; further mixing the carrier gas with said droplets of aqueous liquid moving at accelerated speed and said steam within the mixing tube to cause multitudinous collisions between said droplets and said particulate, and so regulating the flow of said turbulent mixture through said mixing tube as to provide retention time of said turbulent mixture within said portion of said mixing tube in which driving at decreasing speed occurs and said portion of said mixing tube wherein said shock-wave region exists sufficient for reaction of sulfur dioxide in said carrier gas with said alkaline reagent for the formation of aqueous droplets of sulfur-containing reaction products and entrainment of said particulate matter in said droplets and for growth in size of said aqueous droplets, and thereafter separating said droplets thus grown in size from the remainder of said carrier gas.

8. A process for the removal of particulate matter and gaseous sulfur dioxide from a carrier gas comprising driving the carrier gas through an elongate mixing tube and forming a turbulent mixture of steam, atomized water and carrier gas containing particulate matter and gaseous sulfur dioxide in said mixing tube by (a) continuously supplying pressurized steam to the inlet of the nozzle of a steam ejector and expanding said steam through said nozzle to form a jet of said steam directed into the mixing tube at supersonic velocity and having a central region of uniform velocity and a surrounding region of non-uniform transverse velocity profile, (b) forming a series of jet sprays of relatively cold aqueous liquid containing an alkaline reagent in a first atomized condition disposed circumferentially about the jet of steam emerging from said nozzle and (c) further atomizing said aqueous liquid containing said alkaline reagent by directing said jet sprays into said surrounding region of said jet of steam; further mixing the carrier gas with said further atomized aqueous liquid and said steam within the mixing tube, and so regulating the flow of said turbulent mixture through said mixing tube as to provide retention time of said turbulent mixture in said mixing tube sufficient for reaction of sulfur dioxide in said carrier gas with said alkaline reagent for the formation of aqueous droplets of sulfur-containing reaction products and entrainment of said particulate matter in said droplets and for growth in size of said aqueous droplets, and thereafter separating said aqueous droplets thus grown in size from the remainder of said carrier gas; said regulating of flow of said turbulent mixture through said mixing tube being effected by (a) regulating the rate of supply of steam to said nozzle to establish desired volumetric rate of driving of said carrier gas through said mixing tube, and (b) regulating the volumetric rate of flow of said aqueous liquid through said series of jet sprays in accordance with any variations in the characteristics such as quantity and particle sizes of said particulate matter carried by said carrier gas.

9. A process in accordance with claim 1 in which said jet sprays of aqueous liquid are directed into said outer regions of said jet of steam in positions closely adjacent to the exit of said steam jet from said nozzle of said steam ejector.

10. A process in accordance with claim 2 in which said jet sprays of aqueous liquid are directed into said surrounding region of said jet of steam in positions closely adjacent to the exit of said steam jet from said nozzle of said steam ejector.

11. A process in accordance with claim 3 in which said jet sprays of aqueous liquid are directed into said outer regions of said jet of steam in positions closely adjacent to the exit of said steam jet from said nozzle of said steam ejector.

12. A process in accordance with claim 4 in which said jet sprays of aqueous liquid are directed into said surrounding region of said jet of steam in positions closely adjacent to the exit of said steam jet from said nozzle of said steam ejector.

13. A process in accordance with claim 5 in which said jet sprays of aqueous liquid containing alkaline reagent are directed into said outer regions of said jet of steam in positions closely adjacent to the exit of said steam jet from said nozzle of said steam ejector.

14. A process in accordance with claim 6 in which said jet sprays of aqueous liquid containing said alkaline reagent are directed into said surrounding region of said jet of steam in positions closely adjacent to the exit of said steam jet from said nozzle of said steam ejector.

15. A process in accordance with claim 7 in which said jet sprays of aqueous liquid containing said alkaline reagent are directed into said outer regions of said jet of steam in positions closely adjacent to the exit of said steam jet from said nozzle of said steam ejector.

16. A process in accordance with claim 8 in which said jet sprays of aqueous liquid containing said alkaline reagent are directed into said surrounding region of said jet of steam in positions closely adjacent to the exit of said steam jet from said nozzle of said steam ejector.

17. A process in accordance with claim 5 in which said alkaline reagent consists essentially of at least one of the reagents selected from the group consisting of calcium oxide, calcium hydroxide and sodium hydroxide.

18. A process in accordance with claim 6 in which said alkaline reagent consists essentially of at least one of the reagents selected from the group consisting of calcium oxide, calcium hydroxide and sodium hydroxide.

19. A process in accordance with claim 7 in which said alkaline reagent consists essentially of at least one of the reagents selected from the group consisting of calcium oxide, calcium hydroxide and sodium hydroxide.

20. A process in accordance with claim 8 in which said alkaline reagent consists essentially of at least one of the reagents selected from the group consisting of calcium oxide, calcium hydroxide and sodium hydroxide.

21. A process for the removal of particulate matter and organic odors from a carrier gas comprising driving the carrier gas through an elongate mixing tube and forming a turbulent mixture of steam, atomized water and carrier gas containing particulate matter and organic odors in said mixing tube by (a) continuously supplying pressurized steam to the inlet of the nozzle of a steam ejector and expanding said steam through said nozzle to form a jet of said steam directed into the mixing tube, (b) forming a series of jet sprays of relatively cold aqueous liquid containing an oxidant in a first atomized condition disposed circumferentially about the jet of steam emerging from said nozzle and (c) further atomizing said aqueous liquid containing said oxidant by directing said jet sprays into the outer regions of said jet of steam; further mixing the carrier gas with said further atomized aqueous liquid and said steam within the mixing tube, and so regulating the flow of said turbulent mixture through said mixing tube as to provide retention time of said turbulent mixture in said mixing tube sufficient for reaction of organic odors in said carrier gas with said oxidant for the formation of aqueous droplets containing reaction products of said organic odors and entrainment of said particulate matter in said droplets and for growth in size of said aqueous droplets, and thereafter separating said aqueous droplets thus grown in size from the remainder of said carrier gas.

22. A process in accordance with claim 21 in which said oxidant comprises potassium permanganate.

23. A process for the removal of particulate matter and organic odors from a carrier gas comprising driving the carrier gas through an elongate mixing tube and forming a turbulent mixture of steam, atomized water and carrier gas containing particulate matter and organic odors in said mixing tube by (a) continuously supplying pressurized steam to the inlet of the nozzle of a steam ejector and expanding said steam through said nozzle to form a jet of said steam directed into the mixing tube at supersonic velocity and having a central region of uniform velocity and a surrounding region of nonuniform transverse velocity profile, (b) forming a series of jet sprays of relatively cold aqueous liquid containing an oxidant in a first atomized condition disposed circumferentially about the jet of steam emerging from said nozzle and (c) further atomizing said aqueous liquid containing said oxidant by directing said jet sprays into said surrounding region of said jet of steam; further mixing the carrier gas with said further atomized aqueous liquid and said steam within the mixing tube, and so regulating the flow of said turbulent mixture through said mixing tube as to provide retention time of said turbulent mixture in said mixing tube sufficient for reaction of organic odors in said carrier gas with said oxidant for the formation of aqueous droplets containing reaction products of said organic odors and entrainment of said particulate matter in said droplets and for growth in size of said aqueous droplets, and thereafter separating said aqueous droplets thus grown in size from the remainder of said carrier gas.

24. A process in accordance with claim 23 in which said oxidant comprises potassium permanganate.

25. A process for the removal of particulate matter and organic odors from a carrier gas comprising driving the carrier gas through an elongate cylindrical mixing tube and forming a turbulent mixture of steam, atomized water and carrier gas containing particulate matter and organic odors in said mixing tube by (a) continuously supplying pressurized steam to the inlet of the nozzle of a steam ejector and expanding said steam through said nozzle to form a jet of said steam directed into the mixing tube at supersonic velocity and expanding in generally conical configuration through a portion of the length of said mixing tube and extending to a point within said mixing tube where the outer regions of said jet of steam still moving at supersonic velocity engage the inner surface of said mixing tube to hook up with said mixing tube thus to drive said carrier gas and steam at a decreasing velocity through a portion of the length of said mixing tube into a portion of the length of said mixing tube wherein at least one shock wave region exists, (b) forming a series of jet sprays of relatively cold aqueous liquid containing an oxidant in a first atomized condition disposed circumferentially about the jet of steam emerging from said nozzle and (c) further atomizing and accelerating the droplets of said atomized aqueous liquid to a velocity level above the speed of the particulate in said carrier gas by directing said jet sprays into said outer regions of said jet of steam; further mixing the carrier gas with said droplets of aqueous liquid moving at accelerated speed and said steam within the mixing tube to cause multitudinous collisions between said droplets and said particulate, and so regulating the flow of said turbulent mixture through said mixing tube as to provide retention time of said turbulent mixture within said portion of said mixing tube in which driving at decreasing speed occurs and said portion of said mixing tube wherein said shock-wave region exists sufficient for reaction of organic odors in said carrier gas with said oxidant for the formation of aqueous droplets containing reaction products of said organic odors and entrainment of said particulate matter in said droplets and for growth in size of said aqueous droplets, and thereafter separating said droplets thus grown in size from the remainder of said carrier gas.

26. A process in accordance with claim 25 in which said oxidant comprises potassium permanganate.

27. A process for the removal of particulate matter and organic odors from a carrier gas comprising driving the carrier gas through an elongate mixing tube and forming a turbulent mixture of steam, atomized water and carrier gas containing particulate matter and organic odors in said mixing tube by (a) continuously supplying pressurized steam to the inlet of the nozzle of a steam ejector and expanding said steam through said nozzle to form a jet of said steam directed into the mixing tube at supersonic velocity and having a central region of uniform velocity and a surrounding region of non-uniform transverse velocity profile, (b) forming a series of jet sprays of relatively cold aqueous liquid containing an oxidant in a first atomized condition disposed circumferentially about the jet of steam emerging from said nozzle and (c) further atomizing said aqueous liquid containing said oxidant by directing said jet sprays into said surrounding region of said jet of steam; further mixing the carrier gas with said further atomized aqueous liquid and said steam within the mixing tube, and so regulating the flow of said turbulent mixture through said mixing tube as to provide retention time of said turbulent mixture in said mixing tube sufficient for reaction of organic odors in said carrier gas with said oxidant for the formation of aqueous droplets containing reaction products of said organic odors and entrainment of said particulate matter in said droplets and for growth in size of said aqueous droplets, and thereafter separating said aqueous droplets thus grown in size from the remainder of said carrier gas; said regulating of flow of said turbulent mixture through said mixing tube being effected by (a) regulating the rate of supply of steam to said nozzle to establish desired volumetric rate of driving of said particulate-containing carrier gas through said mixing tube, and (b) regulating the volumetric rate of flow of said aqueous liquid through said series of jet sprays in accordance with any variations in the characteristics such as quantity and particle sizes of said particulate matter carried by said carrier gas.

28. A process in accordance with claim 27 in which said oxidant comprises potassium permanganate.

* * * * *

UNITED STATES PATENT OFFICE
CERTIFICATE OF CORRECTION

Patent No. 3,852,409　　　　　　　　Dated December 3, 1974

Inventor(s) Willis Leon Martin, et al.

It is certified that error appears in the above-identified patent and that said Letters Patent are hereby corrected as shown below:

Column 14, Table 3　　　in first line of heading "Or" should be --On--

Column 21, line 56　　　insert "said" before --alkaline--
Claim 13

Signed and sealed this 15th day of July 1975.

(SEAL)
Attest:

RUTH C. MASON
Attesting Officer

C. MARSHALL DANN
Commissioner of Patents
and Trademarks